(12) United States Patent
Zhou et al.

(10) Patent No.: US 10,240,930 B2
(45) Date of Patent: Mar. 26, 2019

(54) SENSOR FUSION

(71) Applicant: SZ DJI TECHNOLOGY CO., LTD., Shenzhen, Guangdong (CN)

(72) Inventors: Gu-yue Zhou, Shenzhen (CN); Shuo Yang, Shenzhen (CN); Yong-jian Zhao, Shenzhen (CN); Ang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/236,315

(22) PCT Filed: Dec. 10, 2013

(86) PCT No.: PCT/CN2013/088971
§ 371 (c)(1),
(2) Date: Jan. 30, 2014

(87) PCT Pub. No.: WO2015/085483
PCT Pub. Date: Jun. 18, 2015

(65) Prior Publication Data
US 2016/0273921 A1    Sep. 22, 2016

(51) Int. Cl.
*G01C 21/16* (2006.01)
*G01S 19/49* (2010.01)
(Continued)

(52) U.S. Cl.
CPC ............ *G01C 21/165* (2013.01); *G01S 19/48* (2013.01); *G01S 19/49* (2013.01); *G05D 1/101* (2013.01)

(58) Field of Classification Search
CPC ....... G01C 21/165; G01S 19/48; G01S 19/49; G05D 1/101
See application file for complete search history.

(56) References Cited

U.S. PATENT DOCUMENTS 5,173,947 A   12/1992   Chande et al.
5,631,640 A    5/1997   Deis et al.
(Continued)

FOREIGN PATENT DOCUMENTS

CA       2830009 A1     6/2014
CN     101403620 A      4/2009
(Continued)

OTHER PUBLICATIONS

T. Krajnik, V. Vonasek, D. Fiser and J. Faigl, "AR-Drone as a Platform for Robotic Research and Education," In Proc. International Conference of Research and Education in Robotics—EUROBOT 2011, Prague, Czech Republic, Jun. 2011, pp. 172-186.*

(Continued)

*Primary Examiner* — Peter D Nolan
(74) *Attorney, Agent, or Firm* — Anova Law Group, PLLC

(57) ABSTRACT

Systems, methods, and devices are provided for collecting positional information for and controlling a movable object. In one aspect of the present disclosure, a method for collecting positional information for a movable object includes: receiving data from a first sensing system coupled to the movable object; receiving data from a second sensing system coupled to the movable object; determining a weight value for the data from the second sensing system based on a strength of the signal received by the sensor of the second sensing system; and calculating the positional information of the movable object based on (i) the data from the first sensing system and (ii) data from the second system factoring in the weight value.

20 Claims, 10 Drawing Sheets

(51) Int. Cl.
  *G01S 19/48* (2010.01)
  *G05D 1/10* (2006.01)

(56) References Cited

U.S. PATENT DOCUMENTS

| | | | |
|---|---|---|---|
| 5,682,229 A | 10/1997 | Wangler | |
| 5,716,032 A | 2/1998 | McIngvale | |
| 5,785,281 A | 7/1998 | Peter et al. | |
| 6,056,237 A | 5/2000 | Woodland | |
| 6,122,572 A | 9/2000 | Yavnai | |
| 6,377,875 B1 | 4/2002 | Schwaerzler | |
| 6,377,889 B1 | 4/2002 | Soest | |
| 6,597,987 B1* | 7/2003 | Barton | G01C 21/30 340/988 |
| 6,661,918 B1 | 12/2003 | Gordon et al. | |
| 6,804,607 B1 | 10/2004 | Wood | |
| 6,985,810 B2 | 1/2006 | Moitra et al. | |
| 7,107,148 B1 | 9/2006 | Bodin et al. | |
| 7,130,741 B2 | 10/2006 | Bodin et al. | |
| 7,158,877 B2 | 1/2007 | Carlsson et al. | |
| 7,195,200 B2 | 3/2007 | Yamane | |
| 7,228,232 B2 | 6/2007 | Bodin et al. | |
| 7,231,294 B2 | 6/2007 | Bodin et al. | |
| 7,242,791 B2* | 7/2007 | Han | G05D 1/0278 348/116 |
| 7,266,477 B2 | 9/2007 | Foessel | |
| 7,302,316 B2 | 11/2007 | Beard et al. | |
| 7,431,243 B1 | 10/2008 | Allen | |
| 7,494,320 B2 | 2/2009 | Muren | |
| 7,512,462 B2 | 3/2009 | Nichols et al. | |
| 7,571,051 B1 | 8/2009 | Shulman | |
| 7,606,115 B1 | 10/2009 | Cline et al. | |
| 7,737,878 B2 | 6/2010 | Van Tooren et al. | |
| 7,747,067 B2 | 6/2010 | Popescu et al. | |
| 7,792,330 B1 | 9/2010 | Lowder et al. | |
| 7,979,174 B2 | 7/2011 | Fregene et al. | |
| 8,072,581 B1 | 12/2011 | Breiholz | |
| 8,082,102 B2 | 12/2011 | Ravenscroft | |
| 8,108,092 B2 | 1/2012 | Phillips et al. | |
| 8,108,139 B1 | 1/2012 | Pylant | |
| 8,116,928 B2 | 2/2012 | Wu et al. | |
| 8,275,544 B1 | 9/2012 | Wells et al. | |
| 8,355,834 B2 | 1/2013 | Duggan et al. | |
| 8,374,786 B2* | 2/2013 | Buros | G01S 19/48 701/408 |
| 8,378,881 B2 | 2/2013 | LeMire et al. | |
| 8,380,425 B2 | 2/2013 | Duggan et al. | |
| 8,401,225 B2 | 3/2013 | Newcombe et al. | |
| 8,521,339 B2 | 8/2013 | Gariepy et al. | |
| 8,538,673 B2 | 9/2013 | Sislak et al. | |
| 8,543,265 B2 | 9/2013 | Ekhaguere et al. | |
| 8,566,071 B2* | 10/2013 | Shumaker | G09B 9/12 434/31 |
| 8,666,661 B2* | 3/2014 | Higgins | G06T 7/2033 348/117 |
| 8,676,498 B2* | 3/2014 | Ma | G01C 21/165 345/633 |
| 8,711,206 B2 | 4/2014 | Newcombe et al. | |
| 8,712,679 B1 | 4/2014 | Mostofi et al. | |
| 8,798,922 B2 | 8/2014 | Tillotson et al. | |
| 8,825,226 B1 | 9/2014 | Worley, III et al. | |
| 8,868,328 B1 | 10/2014 | Estkowski | |
| 8,909,391 B1 | 12/2014 | Peeters et al. | |
| 8,996,207 B2 | 3/2015 | Goossen et al. | |
| 9,031,782 B1* | 5/2015 | Lemay | G01C 21/00 701/445 |
| 9,051,043 B1 | 6/2015 | Peeters et al. | |
| 9,056,676 B1 | 6/2015 | Wang | |
| 9,085,354 B1 | 7/2015 | Peeters et al. | |
| 9,164,506 B1 | 10/2015 | Zang | |
| 9,367,067 B2 | 6/2016 | Gilmore et al. | |
| 9,592,911 B2 | 3/2017 | Liu et al. | |
| 9,592,912 B1 | 3/2017 | Michini et al. | |
| 9,604,723 B2 | 3/2017 | Liu et al. | |
| 9,625,907 B2 | 4/2017 | Hu et al. | |
| 9,625,909 B2 | 4/2017 | Hu et al. | |
| 2003/0055540 A1 | 3/2003 | Hansen | |
| 2003/0152892 A1 | 8/2003 | Huang et al. | |
| 2003/0191561 A1 | 10/2003 | Vos | |
| 2004/0028258 A1 | 2/2004 | Naimark et al. | |
| 2004/0167667 A1 | 8/2004 | Goncalves et al. | |
| 2004/0193334 A1 | 9/2004 | Carlsson et al. | |
| 2005/0004723 A1 | 1/2005 | Duggan et al. | |
| 2005/0109872 A1 | 5/2005 | Voos et al. | |
| 2005/0128196 A1 | 6/2005 | Popescu et al. | |
| 2005/0182518 A1 | 8/2005 | Karlsson | |
| 2005/0238200 A1 | 10/2005 | Gupta et al. | |
| 2006/0015247 A1 | 1/2006 | Speer | |
| 2006/0049930 A1 | 3/2006 | Zruya et al. | |
| 2006/0058931 A1 | 3/2006 | Ariyur et al. | |
| 2006/0106506 A1 | 5/2006 | Nichols et al. | |
| 2006/0147088 A1* | 7/2006 | Han | G05D 1/0278 382/104 |
| 2006/0149472 A1 | 7/2006 | Han et al. | |
| 2006/0197937 A1 | 9/2006 | Bamji et al. | |
| 2006/0222207 A1 | 10/2006 | Balzer et al. | |
| 2006/0235610 A1 | 10/2006 | Ariyur et al. | |
| 2007/0018052 A1 | 1/2007 | Eriksson | |
| 2007/0093945 A1 | 4/2007 | Grzywna et al. | |
| 2007/0106473 A1 | 5/2007 | Bodin et al. | |
| 2007/0156286 A1 | 7/2007 | Yamauchi | |
| 2007/0193798 A1 | 8/2007 | Allard et al. | |
| 2007/0252748 A1 | 11/2007 | Rees et al. | |
| 2007/0280528 A1 | 12/2007 | Wellington et al. | |
| 2008/0009965 A1 | 1/2008 | Bruemmer et al. | |
| 2008/0027591 A1 | 1/2008 | Lenser et al. | |
| 2008/0033645 A1 | 2/2008 | Levinson et al. | |
| 2008/0059015 A1 | 3/2008 | Whittaker et al. | |
| 2008/0059065 A1 | 3/2008 | Strelow et al. | |
| 2008/0154490 A1 | 6/2008 | Hoofd et al. | |
| 2008/0195304 A1 | 8/2008 | Krishnaswamy | |
| 2008/0195316 A1 | 8/2008 | Krishnaswamy | |
| 2008/0215204 A1 | 9/2008 | Roy et al. | |
| 2009/0027253 A1 | 1/2009 | Van Tooren et al. | |
| 2009/0157233 A1 | 6/2009 | Kokkeby et al. | |
| 2009/0167761 A1 | 7/2009 | Hayashi et al. | |
| 2009/0177398 A1 | 7/2009 | Belenkii et al. | |
| 2009/0210109 A1 | 8/2009 | Ravenscroft | |
| 2009/0213240 A1 | 8/2009 | Sim et al. | |
| 2009/0234499 A1 | 9/2009 | Nielsen et al. | |
| 2009/0248304 A1 | 10/2009 | Roumeliotis et al. | |
| 2010/0001902 A1 | 1/2010 | Smith | |
| 2010/0004798 A1 | 1/2010 | Bodin et al. | |
| 2010/0017115 A1* | 1/2010 | Gautama | G01C 21/28 701/533 |
| 2010/0030470 A1 | 2/2010 | Wang et al. | |
| 2010/0040279 A1 | 2/2010 | Yoon et al. | |
| 2010/0304070 A1 | 2/2010 | Meles | |
| 2010/0063651 A1* | 3/2010 | Anderson | G05D 1/0088 701/2 |
| 2010/0084513 A1 | 4/2010 | Gariepy et al. | |
| 2010/0100269 A1 | 4/2010 | Ekhaguere et al. | |
| 2010/0109945 A1* | 5/2010 | Roh | G01S 19/49 342/357.32 |
| 2010/0198514 A1 | 8/2010 | Miralles | |
| 2010/0250022 A1 | 9/2010 | Hines et al. | |
| 2010/0250133 A1* | 9/2010 | Buros | G01S 19/48 701/472 |
| 2010/0256909 A1 | 10/2010 | Duggan et al. | |
| 2010/0265126 A1 | 10/2010 | Mao | |
| 2010/0280699 A1 | 11/2010 | Bageshwar et al. | |
| 2010/0303340 A1 | 12/2010 | Abraham et al. | |
| 2010/0305778 A1 | 12/2010 | Dorneich et al. | |
| 2010/0312917 A1 | 12/2010 | Allport | |
| 2011/0054689 A1 | 3/2011 | Nielsen et al. | |
| 2011/0084162 A1 | 4/2011 | Goossen et al. | |
| 2011/0106339 A1 | 5/2011 | Phillips et al. | |
| 2011/0123135 A1 | 5/2011 | Hsieh et al. | |
| 2011/0178658 A1 | 7/2011 | Kotaba et al. | |
| 2011/0178669 A1 | 7/2011 | Tanaka et al. | |
| 2011/0246015 A1 | 10/2011 | Cummings et al. | |
| 2011/0264427 A1* | 10/2011 | Shumaker | G09B 9/12 703/6 |
| 2011/0282523 A1 | 11/2011 | Shue | |

(56) References Cited

U.S. PATENT DOCUMENTS

| | | | |
|---|---|---|---|
| 2011/0282622 A1 | 11/2011 | Canter | |
| 2012/0078510 A1* | 3/2012 | Ma | G01C 21/165 |
| | | | 701/426 |
| 2012/0083945 A1* | 4/2012 | Oakley | B64C 27/08 |
| | | | 701/2 |
| 2012/0106800 A1 | 5/2012 | Khan et al. | |
| 2012/0127030 A1* | 5/2012 | Arthur | G01S 19/45 |
| | | | 342/357.28 |
| 2012/0154277 A1 | 6/2012 | Bar-Zeev et al. | |
| 2012/0203450 A1 | 8/2012 | Meyer et al. | |
| 2012/0213436 A1 | 8/2012 | Grindstaff et al. | |
| 2012/0237085 A1 | 9/2012 | Meier | |
| 2012/0245844 A1 | 9/2012 | Lommel et al. | |
| 2012/0281503 A1 | 11/2012 | Rikoski | |
| 2012/0290146 A1* | 11/2012 | Dedes | G08G 1/163 |
| | | | 701/1 |
| 2013/0009950 A1 | 1/2013 | Ben-David et al. | |
| 2013/0050180 A1 | 2/2013 | Bruemmer | |
| 2013/0231779 A1 | 9/2013 | Purkayastha et al. | |
| 2013/0308822 A1* | 11/2013 | Marimon | G01S 5/16 |
| | | | 382/103 |
| 2013/0338856 A1 | 12/2013 | Yelland et al. | |
| 2014/0032013 A1 | 1/2014 | Riley | |
| 2014/0032034 A1 | 1/2014 | Raptopoulos et al. | |
| 2014/0056438 A1 | 2/2014 | Baalu et al. | |
| 2014/0163781 A1 | 6/2014 | Vian et al. | |
| 2014/0222248 A1 | 8/2014 | Levien et al. | |
| 2014/0249693 A1 | 9/2014 | Stark et al. | |
| 2014/0277854 A1 | 9/2014 | Jones et al. | |
| 2014/0350839 A1 | 11/2014 | Pack et al. | |
| 2015/0128823 A1 | 5/2015 | Akcasu et al. | |
| 2015/0148988 A1 | 5/2015 | Fleck | |
| 2015/0212391 A1 | 7/2015 | Waibel et al. | |
| 2015/0269438 A1 | 9/2015 | Samarasekera et al. | |
| 2015/0350614 A1 | 12/2015 | Meier et al. | |
| 2015/0379874 A1 | 12/2015 | Ubhi et al. | |
| 2016/0068267 A1 | 3/2016 | Liu et al. | |
| 2016/0070264 A1 | 3/2016 | Liu et al. | |
| 2016/0070265 A1 | 3/2016 | Liu et al. | |
| 2016/0216710 A1 | 7/2016 | Hu et al. | |
| 2016/0217698 A1 | 7/2016 | Liu et al. | |
| 2016/0225264 A1 | 8/2016 | Taveira | |
| 2016/0273922 A1 | 9/2016 | Stefan | |
| 2017/0045886 A1 | 2/2017 | Liu et al. | |
| 2017/0052541 A1 | 2/2017 | Hu et al. | |

FOREIGN PATENT DOCUMENTS

| | | |
|---|---|---|
| CN | 101445156 A | 6/2009 |
| CN | 201331348 Y | 10/2009 |
| CN | 201331349 Y | 10/2009 |
| CN | 101650891 A | 2/2010 |
| CN | 101667036 A | 3/2010 |
| CN | 101762805 A | 6/2010 |
| CN | 101802738 A | 8/2010 |
| CN | 101867868 A | 10/2010 |
| CN | 101950027 A | 1/2011 |
| CN | 101952737 A | 1/2011 |
| CN | 102023003 A | 4/2011 |
| CN | 102362141 A | 2/2012 |
| CN | 102393747 A | 3/2012 |
| CN | 102460074 A | 5/2012 |
| CN | 102621987 A | 8/2012 |
| CN | 102707724 A | 10/2012 |
| CN | 102749927 A | 10/2012 |
| CN | 102854887 A | 1/2013 |
| CN | 202815124 U | 3/2013 |
| CN | 103116360 A | 5/2013 |
| CN | 203038112 U | 7/2013 |
| CN | 103256931 A | 8/2013 |
| CN | 103323002 A | 9/2013 |
| CN | 103365299 A | 10/2013 |
| CN | 203397214 U | 1/2014 |
| CN | 203397215 U | 1/2014 |
| CN | 103576690 A | 2/2014 |
| CN | 103744430 A | 4/2014 |
| CN | 103901892 A | 7/2014 |
| CN | 103914077 A | 7/2014 |
| CN | 103925920 A | 7/2014 |
| CN | 103941747 A | 7/2014 |
| CN | 103941748 A | 7/2014 |
| CN | 103941750 A | 7/2014 |
| CN | 103970143 A | 8/2014 |
| CN | 103984357 A | 8/2014 |
| CN | 104115082 A | 10/2014 |
| EP | 0588360 A1 | 3/1994 |
| EP | 2177966 A2 | 4/2010 |
| EP | 2515147 A2 | 10/2012 |
| EP | 2592436 A2 | 5/2013 |
| JP | H02241421 A | 9/1990 |
| JP | H08241123 A | 9/1996 |
| JP | H08273100 A | 10/1996 |
| JP | H11282530 A | 10/1999 |
| JP | 2003127994 A | 5/2003 |
| JP | 2004130852 A | 4/2004 |
| JP | 2009041932 A | 2/2006 |
| JP | 2008304260 A | 12/2008 |
| JP | 2010095246 A | 4/2010 |
| JP | 2010095247 A | 4/2010 |
| JP | 2011150512 A | 8/2011 |
| JP | 4852688 B2 | 1/2012 |
| JP | 2012140101 A | 7/2012 |
| JP | 2014002603 A | 1/2014 |
| JP | 2014002604 A | 1/2014 |
| JP | 2014041601 A | 3/2014 |
| WO | 2003004352 A1 | 1/2003 |
| WO | 2009091431 A1 | 7/2009 |
| WO | WO 2009/118043 A1 | 10/2009 |
| WO | WO 2011/120141 A1 | 10/2011 |
| WO | WO 2013/163746 A1 | 11/2013 |
| WO | WO-2014108026 A1 | 7/2014 |

OTHER PUBLICATIONS

International search report and written opinion dated May 26, 2015 for PCT/CN2014/086005.

European search report—partial dated Feb. 22, 2016 for EP Application No. 13828970.

Notice of allowance dated Mar. 22, 2016 for U.S. Appl. No. 14/801,599.

Notice of allowance dated Mar. 28, 2016 for U.S. Appl. No. 14/801,640.

U.S. Appl. No. 15/088,551, filed Apr. 1, 2016, Hu et al.

U.S. Appl. No. 15/088,645, filed Apr. 1, 2016, Liu et al.

Merchant. Image information needed for autonomous systems, Proc. SPIE 5807, Automatic Target Recognition XV, 261 (May 23, 2005); doi:10.1117/12.605794.

Office action dated May 12, 2016 for U.S. Appl. No. 14/814,159.

Office action dated May 16, 2016 for U.S. Appl. No. 15/088,551.

Ross, et al. Multi-Sensor 3D image Fusion and interactive search. Information Fusion, 2000. FUSION 2000. Proceedings of the Third International Conference on. vol. 1. IEEE, 2000.

Office action dated Jun. 8, 2016 for U.S. Appl. No. 15/088,645.

Bills, et al. Autonomous MAV flight in indoor environments using single image perspective cues. 2011 IEEE International Conference on Robotics and Automation (ICRA). May 9-13, 2011; 5776-5783. DOI:10.1109/ICRA.2011.5980136.

European search report and opinion dated Jul. 6, 2016 for EP Application No. 14889182.

Serranoa, et al. Seamless indoor-outdoor navigation for unmanned multi-sensor aerial platforms. The International Archives of Photogrammetry, Remote Sensing and Spatial Information Sciences Mar. 5, 2014; XL-3/W1:115-122.

Notice of allowance dated Aug. 9, 2016 for U.S. Appl. No. 15/088,551.

Extended European search report and opinion dated Aug. 3, 2016 for EP Application No. 13828970.

Soloviev, et al. Tight coupling of GPS, laser scanner, and inertial measurements for navigation in urban environments. 2008 IEEE/ION Position, Location and Navigation Symposium. IEEE, 2008. 511-525.

(56) References Cited

OTHER PUBLICATIONS

Co-pending U.S. Appl. No. 15/277,455, filed Sep. 27, 2016.
Co-pending U.S. Appl. No. 15/340,404, filed Nov. 1, 2016.
Masone, et al. Semi-autonomous Trajectory Generation for Mobile Robots with Integral Haptic Shared Control, In Proc. 2014 IEEE Intl Conference on Robotics and Automation, pp. 6468-6475, Jun. 7, 2014.
Notice of allowance dated May 24, 2016 for U.S. Appl. No. 14/801,640.
Notice of allowance dated Jun. 27, 2016 for U.S. Appl. No. 14/801,599.
Notice of allowance dated Jul. 13, 2016 for U.S. Appl. No. 14/801,640.
Notice of allowance dated Oct. 3, 2016 for U.S. Appl. No. 15/088,645.
Office action dated May 16, 2016 for U.S. Appl. No. 14/845,894.
International search report and written opinion dated Sep. 15, 2014 for PCT/CN2013/088971.
Sanfourche, et al. Perception for UAV: Vision-based navigation and environment modeling. Journal Aerospace Lab 4 (2012): 1-19.
Thrun, et al. Integrating grid-based and topological maps for mobile robot navigation. In Proceedings of the National Conference on Artificial Intelligence. Portland, Oregon. Aug. 1996; (pp. 944-951).
Corke, et al. An Introduction to Inertial and Visual Sensing. The International Journal of Robotics Research 2007 26: 519-535. DOI: 10.1177/0278364907079279.
European search report and search opinion dated Mar. 20, 207 for EP Application No. 14901421.9.
Notice of allowance dated Dec. 1, 2016 for U.S. Appl. No. 14/801,599.
Notice of allowance dated Dec. 2, 2016 for U.S. Appl. No. 14/801,640.
Notice of allowance dated Dec. 9, 2016 for U.S. Appl. No. 15/088,645.
Notice of allowance dated Apr. 12, 2017 for U.S. Appl. No. 14/814,159.
United States Patent Office (USPTO) Notice of Allowance for U.S. Appl. No. 14/814,159 dated May 4, 2017 2 Pages.
Parra, et al. Visual odometry and map fusion for GPS navigation assistance. In Industrial Electronics (ISIE), Jun. 2011 IEEE International Symposium on (pp. 832-837). IEEE.
World Intellectual Property Organization (WIPO) International Search Report and Written Opinion for PCT/CN2014/086006 dated May 29, 2015 7 Pages.
World Intellectual Property Organization (WIPO) International Search Report and Written Opinion for PCT/CN2014/086007 dated Jun. 10, 2015 7 Pages.
United States Patent Office (USPTO) Office Action for U.S. Appl. No. 14/814,159 dated Oct. 22, 2015 8 Pages.
United States Patent Office (USPTO) Office Action for U.S. Appl. No. 14/801,640 dated Oct. 28, 2015 9 Pages.
United States Patent Office (USPTO) Office Action for U.S. Appl. No. 14/801,599 dated Nov. 17, 2015 14 Pages.
As Filed U.S. Appl. No. 14/801,599, filed Jul. 16, 2015 71 Pages.
As Filed U.S. Appl. No. 14/801,640, filed Jul. 16, 2015 81 Pages.
As Filed U.S. Appl. No. 14/814,159, filed Jul. 30, 2015 90 Pages.
Fengchun Zhu, Research on Navigation and Environment Modeling of Mobile Robot, Dissertation of Doctor of Philosophy, College of Information and Electrical Engineering, Shandong University of Science and Technology, May 2007, 150 Pages.
United States Patent and Trademark Office (USPTO) Notice of Allowance for U.S. Appl. No. 14/801,599 dated Feb. 28, 2017.
United States Patent and Trademark Office (USPTO) Notice of Allowance for U.S. Appl. No. 14/801,599 dated Jan. 6, 2017.
United States Patent and Trademark Office (USPTO) Notice of Allowance for U.S. Appl. No. 15/088,551 dated Jan. 20, 2017.
United States Patent and Trademark Office (USPTO) Notice of Allowance for U.S. Appl. No. 15/088,551 dated Jan. 26, 2017.
United States Patent and Trademark Office (USPTO) Notice of Allowance for U.S. Appl. No. 14/801,640 dated Feb. 10, 2017.
United States Patent and Trademark Office (USPTO) Notice of Allowance for U.S. Appl. No. 15/088,645 dated Feb. 10, 2017.
United States Patent and Trademark Office (USPTO) Office Action for U.S. Appl. No. 15/340,404 dated Jun. 21, 2017.
Evan Dill et al., Seamless Indoor-Outdoor Navigation for Unmanned Multi-Sensor Aerial Platforms, In Position, Location and Navidation Symposium-PLANS 2014, 2014 IEE/ION, pp. 1174-1182.
Yanmin Wang et al., Point Cloud Management Based on Depth Images, Dec. 31, 2013, pp. 9, Surveying and Mapping Press. China.
Yulin Zhang, Image Engineering: Image Understanding (III), Dec. 31, 2012, pp. 106, vol. 3, Tsinghua University, Beijing, China.
Hideaki Shiori et al., Collision Avoidance Control Law of Aircraft under Uncertain Information; Journal of the Japan Society for Aeronautical and Space Sciences, Aug. 2003, pp. 427-432, vol. 51, Issue 595, Japan.

\* cited by examiner

SENSOR FUSION

BACKGROUND OF THE INVENTION

Unmanned vehicles, such as ground vehicles, air vehicles, surface vehicles, underwater vehicles, and spacecraft, have been developed for a wide range of applications including surveillance, search and rescue operations, exploration, and other fields. Such unmanned vehicles can often be controlled and navigated by a remote controller. In some instances, unmanned vehicles can be autonomous vehicles capable of sensing and navigating through an environment without guidance from a human controller.

Various types of sensors can be used to generate positional information enabling control and navigation of an unmanned vehicle. However, current sensing systems for unmanned vehicles can be less than ideal. For example, most sensing systems are accurate only under certain environmental conditions (e.g., indoors or outdoors, high altitude or low altitude) or with respect to certain types of movement (e.g., fast or slow, rotational or translational).

SUMMARY OF THE INVENTION

A need exists for improved systems, methods, and devices for collecting positional information for movable objects such as unmanned vehicles. The present invention provides systems, methods, and devices for collecting positional information and controlling a movable object. In many embodiments, the systems, methods, and devices disclosed herein receive positional data for a movable object from a plurality of sensing systems and determine the positional information of the movable object through sensor fusion. The present invention enhances flexibility and accuracy of navigation systems for movable objects such as unmanned aerial vehicles.

In one aspect of the present disclosure, a method for collecting positional information for a movable object is described. The method includes: receiving, at a memory, data from a first sensing system coupled to the movable object, the first sensing system including a sensor that receives a signal useful for determining the positional information of the movable object; receiving, at the memory, data from a second sensing system coupled to the movable object, the second sensing system including a sensor that receives a signal useful for determining the positional information of the movable object; determining, with aid of a processor, a weight value for the data from the second sensing system based on a strength of the signal received by the sensor of the second sensing system; and calculating, with aid of the processor, the positional information of the movable object based on (i) the data from the first sensing system and (ii) data from the second system factoring in the weight value.

In some embodiments, the movable object is an unmanned aerial vehicle.

In some embodiments, calculating the positional information includes calculating location information and orientation information of the movable object. Calculating the location information can include calculating altitude, latitude, and longitude of the movable object. Calculating the orientation information can include calculating an angle of the movable object with respect to a yaw axis, an angle with respect to a roll axis, and an angle with respect to a pitch axis.

In some embodiments, receiving data from the second sensing system includes receiving data from a global positioning system (GPS) sensor used by the second sensing system. The strength of the signal received by the GPS sensor of the second sensing system can depend on a number of GPS signals received or a magnitude of a GPS signal received.

In some embodiments, receiving data from the first sensing system includes receiving data from one or more vision sensors used by the first sensing system. Receiving data from the one or more vision sensors can include receiving data from a plurality of vision sensors that are laterally spaced apart. The method can further include receiving data from third sensing system coupled to the movable object, said third sensing system using an inertial measurement unit (IMU).

In some embodiments, receiving data from the first sensing system comprises receiving data from an IMU used by the first sensing system.

In some embodiments, the signal useful for determining the positional information includes an optical signal, a signal from a satellite, or a signal indicative of velocity or acceleration.

In some embodiments, the weight value is a numerical value. The weight value can be a value between zero and one.

In some embodiments, the method includes receiving an instruction for the movable object to return to a preset location. The method can further include calculating, with aid of the processor, a route for the movable object to travel to return to the present location, based on the positional information of the movable object.

In another aspect of the present disclosure, a non-transitory computer readable medium containing program instructions for collecting positional information for a movable object is provided. The computer readable medium includes: program instructions for analyzing data received from a first sensing system coupled to the movable object, the first sensing system including a sensor that receives a signal useful for determining the positional information of the movable object; program instructions for analyzing data received from a second sensing system coupled to the movable object, the second sensing system including a sensor that receives a signal useful for determining the positional information of the movable object; program instructions for determining a weight value for the data from the second sensing system based on a strength of the signal received by the sensor of the second sensing system; and program instructions for calculating the positional information of the movable object based on (i) the data from the first sensing system and (ii) data from the second system factoring in the weight value.

In some embodiments, the movable object is an unmanned aerial vehicle.

In some embodiments, the program instructions for calculating the positional information include program instructions for calculating location information and orientation information of the movable object. The program instructions for calculating location information can include program instructions for calculating altitude, latitude, and longitude of the movable object. The program instructions for calculating orientation information can include program instructions for calculating an angle of the movable object with respect to a yaw axis, an angle with respect to a roll axis, and an angle with respect to a pitch axis.

In some embodiments, the program instructions for analyzing data received from the second sensing system include program instructions for analyzing data received from a GPS sensor used by the second sensing system. The strength of the signal received by the GPS sensor of the second sensing system can depend on a number of GPS signals received or a magnitude of a GPS signal received.

In some embodiments, the program instructions for analyzing data received from the first sensing system includes program instructions for analyzing data received from one or more vision sensors used by the first sensing system. The program instructions for analyzing data received from the one or more vision sensors can include program instructions for analyzing data received from a plurality of vision sensors that are laterally spaced apart. The computer readable medium can further include program instructions for analyzing data received from a third sensing system coupled to the movable object, the third sensing system using an IMU.

In some embodiments, the program instructions for analyzing data received from the first sensing system include program instructions for analyzing data received from an IMU used by the first sensing system.

In some embodiments, the signal useful for determining the positional information includes an optical signal, a signal from a satellite, or a signal indicative of velocity or acceleration.

In some embodiments, the weight value is a numerical value. The weight value can be a value between zero and one.

In some embodiments, the computer readable medium further includes program instructions for receiving an instruction for the movable object to return to a preset location. The computer readable medium can further include program instructions for calculating, with aid of the processor, a route for the movable object to travel to return to the preset location, based on the positional information of the movable object.

In another aspect of the present disclosure, a system for collecting positional information for a movable object is provided. The system includes: a first sensing system coupled to the movable object, the first sensing system including a sensor configured to receive a signal useful for determining the positional information of the movable object; a second sensing system coupled to the movable object, the second sensing system including a sensor configured to receive a signal useful for determining the positional information of the movable object; and a processor that: (a) determines a weight value for the signal from the second sensing system based on a strength of the signal received by the sensor of the second sensing system; and (b) calculates the positional information of the movable object based on (i) the data from the first sensing system and (ii) the data from the second sensing system factoring in the weight value.

In some embodiments, the movable object is an unmanned aerial vehicle.

In some embodiments, the positional information includes location information and orientation information of the movable object. The location information can include altitude, latitude, and longitude of the movable object. The orientation information can include an angle of the movable object with respect to a yaw axis, an angle with respect to a roll axis, and an angle with respect to a pitch axis.

In some embodiments, the second sensing system uses a GPS sensor. The strength of the signal can depend on a number of GPS signals received or a magnitude of a GPS signal received.

In some embodiments, the first sensing system uses one or more vision sensors. The first sensing system can use a plurality of vision sensors that are laterally spaced apart. Data can further be received from a third sensing system coupled to the movable object, said third sensing system using an IMU.

In some embodiments, the first sensing system uses an IMU.

In some embodiments, the signal useful for determining the positional information includes an optical signal.

In some embodiments, the signal useful for determining the positional information includes a signal from a satellite.

In some embodiments, the signal useful for determining the positional information includes a signal indicative of velocity or acceleration.

In some embodiments, the weight value is a numerical value. The weight value can be a value between zero and one.

In some embodiments, the system further includes a receiver for receiving an instruction for the movable object to return to a preset location. The processor can be configured to calculate a route for the movable object to travel to return to the preset location, based on the positional information of the movable object.

In another aspect of the present disclosure, a method for collecting positional information for a movable object is described. The method includes: (a) receiving, at a memory, data from a first sensing system coupled to the movable object, the first sensing system including a sensor that receives a signal useful for determining the positional information of the movable object; (b) receiving, at the memory, data from a second sensing system coupled to the movable object, the second sensing system including a sensor that receives a signal useful for determining the positional information of the movable object; (c) determining, with aid of a processor, whether the signal received by the sensor of the second sensing system has a strength that exceeds a predetermined threshold; and (d) calculating, with aid of the processor, the positional information of the movable object based on (i) the data from the first sensing system without the data from the second sensing system when the strength of the signal of step (b) does not exceed the predetermined threshold, and (ii) data from the first sensing system with the data from the second sensing system when the strength of the signal of step (b) exceeds the predetermined threshold.

In some embodiments, the movable object is an unmanned aerial vehicle.

In some embodiments, calculating the positional information includes calculating location information and orientation information of the movable object. Calculating the location information can include calculating altitude, latitude, and longitude of the movable object. Calculating the orientation information can include calculating an angle of the movable object with respect to a yaw axis, an angle with respect to a roll axis, and an angle with respect to a pitch axis.

In some embodiments, receiving data from the first sensing system includes receiving data from a non-GPS sensing system used by the first sensing system. Receiving data from the non-GPS sensing system can include receiving data from one or more vision sensors used by the non-GPS sensing system. Receiving data from the one or more vision sensors can include receiving data from a plurality of vision sensors laterally spaced apart. The method can further include receiving data from third sensing system coupled to the movable object, said third sensing system using an IMU. Receiving data from the non-GPS sensing system can include receiving data from an IMU used by the non-GPS sensing system.

In some embodiments, receiving data from the second sensing system includes receiving data from a GPS sensor used by the second sensing system. The strength of the signal received by the GPS sensor of the second sensing system can depend on a number of GPS signals received or a magnitude of a GPS signal received.

In some embodiments, the signal useful for determining the positional information includes an optical signal, a signal from a satellite, or a signal indicative of velocity or acceleration.

In some embodiments, the predetermined threshold is greater than a minimum strength of a signal that permits the second sensing system to operate.

In some embodiments, the predetermined threshold is inputted by a user.

In another aspect of the present disclosure, a non-transitory computer readable medium containing program instructions for collecting positional information for a movable object is provided. The computer readable medium includes: (a) program instructions for analyzing data received from a first sensing system coupled to the movable object, the first sensing system including a sensor that receives a signal useful for determining the positional information of the movable object; (b) program instructions for analyzing data received from a second sensing system coupled to the movable object, the second sensing system including a sensor that receives a signal useful for determining the positional information of the movable object; (c) program instructions for determining whether the signal received by the sensor of the second sensing system has a strength that exceeds a predetermined threshold; and program instructions for calculating the positional information of the movable object based on (i) the analyzed data from the first sensing system without the analyzed data from the second sensing system when the strength of the signal of (b) does not exceed the predetermined threshold, and (ii) the analyzed data from the first sensing system with the analyzed data from the second sensing system when the strength of the signal of (b) exceeds the predetermined threshold.

In some embodiments, the movable object is an unmanned aerial vehicle.

In some embodiments, the program instructions for calculating the positional information include program instructions for calculating location information and orientation information of the movable object. The program instructions for calculating the location information can include program instructions for calculating altitude, latitude, and longitude of the movable object. The program instructions for calculating the orientation information can include program instructions for calculating an angle of the movable object with respect to a yaw axis, an angle with respect to a roll axis, and an angle with respect to a pitch axis.

In some embodiments, the program instructions for analyzing data received from the first sensing system include program instructions for analyzing data received from a non-GPS sensing system used by the first sensing system. The program instructions for analyzing data received from the non-GPS sensing system can include program instructions for analyzing data received from one or more vision sensors used by the non-GPS sensing system. The program instructions for analyzing data received from the one or more vision sensors can include program instructions for analyzing data received from a plurality of vision sensors laterally spaced apart. The computer readable medium can further include program instructions for analyzing data received from third sensing system coupled to the movable object, said third sensing system using an IMU. The program instructions for analyzing data received from the non-GPS sensing system can include program instructions for analyzing data received from an IMU used by the non-GPS sensing system.

In some embodiments, the program instructions for analyzing data received from the second sensing system include program instructions for analyzing data received from a GPS sensor used by the second sensing system. The strength of the signal received by the GPS sensor of the second sensing system can depend on a number of GPS signals received or a magnitude of a GPS signal received.

In some embodiments, the signal useful for determining the positional information includes an optical signal, a signal from a satellite, or a signal indicative of velocity or acceleration.

In some embodiments, the predetermined threshold is greater than a minimum strength of a signal that permits the second sensing system to operate.

In some embodiments, the predetermined threshold is inputted by a user.

In another aspect of the present disclosure, a system for collecting positional information for a movable object is provided. The system includes: (a) a first sensing system coupled to the movable object, the first sensing system including a sensor configured to receive a signal useful for determining the positional information of the movable object; (b) a second sensing system coupled to the movable object, the second sensing system including a sensor configured to receive a signal useful for determining the positional information of the movable object; and (c) a processor that: (1) determines whether the signal received by the sensor of the second sensing system has a strength that exceeds a predetermined threshold; and (2) calculate the positional information of the movable object based on (i) the data from the first sensing system without the data from the second sensing system when the strength of the signal of step (b) does not exceed the predetermined threshold, and (ii) data from the first sensing system with the data from the second sensing system when the strength of the signal of step (b) exceeds the predetermined threshold.

In some embodiments, the movable object is an unmanned aerial vehicle.

In some embodiments, the positional information includes location information and orientation information of the movable object. The location information can include altitude, latitude, and longitude of the movable object. The orientation information can include angle of the movable object with respect to a yaw axis, angle with respect to a roll axis, and angle with respect to a pitch axis.

In some embodiments, the first sensing system is a non-GPS sensing system. The non-GPS sensing system can use one or more vision sensors. The non-GPS sensing system can use a plurality of vision sensors laterally spaced apart. Data can further be received from a third sensing system coupled to the movable object, said third sensing system using an IMU. The non-GPS sensing system can use an IMU.

In some embodiments, the second system is a GPS system. The strength of the signal can depend on a number of GPS signals received or a magnitude of a GPS signal received.

In some embodiments, the signal useful for determining the positional information includes an optical signal, a signal from a satellite, or a signal indicative of velocity or acceleration.

In some embodiments, the predetermined threshold is greater than a minimum strength of a signal that permits the second sensing system to operate.

In some embodiments, the predetermined threshold is inputted by a user.

In another aspect of the present disclosure, a method for collecting positional information for a movable object is described. The method includes: receiving, at a memory, an instruction guiding the movable object to follow a pre-stored path that includes positional information for the movable object, the said positional information including location information and orientation information of the movable object; receiving, at a receiver, a velocity profile for the movable object to follow while the movable object is following the pre-stored path; receiving, from one or more sensing systems of the movable object, at least one signal indicative of a position of the movable object relative to the pre-stored path; and causing, with aid of one or more actuators of the movable object, the movable object to follow the pre-stored path in accordance with the velocity profile in response to the at least one signal indicative of the position of the movable object.

In some embodiments, receiving the instruction guiding the movable object to follow the pre-stored path includes receiving an instruction guiding the movable object to follow a path that the movable object has previously traveled and recorded. Receiving the velocity profile can include receiving a velocity value that is different from a velocity of the movable object along the pre-stored path when the movable object previously traveled the pre-stored path.

In some embodiments, receiving the instruction guiding the movable object to follow the pre-stored path includes receiving an instruction guiding the movable object to follow a reverse of a path that the movable object has previously traveled and recorded.

In some embodiments, receiving the instruction guiding the movable object to follow the pre-stored path includes receiving an instruction guiding the movable object to follow a path template including one or more path parameters.

In some embodiments, receiving the instruction guiding the movable object to follow the pre-stored path includes receiving an instruction guiding the movable object to follow a path inputted by a user.

In some embodiments, receiving the instruction guiding the movable object to follow the pre-stored path includes receiving an instruction guiding the movable object to follow a loop that the movable object is capable of following repeatedly.

In some embodiments, receiving the velocity profile includes receiving a variable velocity over the pre-stored path.

In some embodiments, receiving the velocity profile includes receiving a velocity profile inputted by a user.

In some embodiments, causing the movable object to follow the pre-stored path includes altering the velocity profile while the movable object is following the pre-stored path.

In some embodiments, the movable object has a plurality of sensing systems using different types of sensors. The sensing system can include two or more of the following: vision sensing system, IMU, GPS system.

In some embodiments, the movable object is an unmanned aerial vehicle.

In some embodiments, the one or more actuators are motors of the movable object.

In another aspect of the present disclosure, a non-transitory computer readable medium containing program instructions for controlling a movable object is provided. The computer readable medium includes: program instructions for receiving a pre-stored path that includes positional information for the movable object to follow, the said positional information including location information and orientation information of the movable object; program instructions for receiving a velocity profile for the movable object to follow while the movable object is following the pre-stored path; program instructions for analyzing at least one signal indicative of a position of the movable object relative to the pre-stored path from one or more sensing systems of the movable object; and program instructions for providing instructions to one or more actuators of the movable object to cause the movable object to follow the pre-stored path in accordance with the velocity profile in response to the at least one signal indicative of the position of the movable object.

In some embodiments, the program instructions for receiving the pre-stored path include program instructions for receiving a path that the movable object has previously traveled and recorded. The program instructions for receiving the velocity profile can include program instructions for receiving a velocity value that is different from a velocity of the movable object along the pre-stored path when the movable object previously traveled the pre-stored path.

In some embodiments, the program instructions for receiving the pre-stored path include program instructions for receiving a reverse of a path that the movable object has previously traveled and recorded.

In some embodiments, the program instructions for receiving the pre-stored path include program instructions for receiving a path template including one or more path parameters.

In some embodiments, the program instructions for receiving the pre-stored path include program instructions for receiving a path inputted by a user.

In some embodiments, the program instructions for receiving the pre-stored path include program instructions for receiving a loop that the movable object is capable of following repeatedly.

In some embodiments, the program instructions for receiving the velocity profile include program instructions for receiving a variable velocity over the pre-stored path.

In some embodiments, the program instructions for receiving the velocity profile include program instructions for receiving a velocity profile inputted by a user.

In some embodiments, the program instructions for providing instructions to cause the movable object to follow the pre-stored path include program instructions for altering the velocity profile while the movable object is following the pre-stored path.

In some embodiments, the movable object has a plurality of sensing systems using different types of sensors. The sensing system can include two or more of the following: vision sensing system, IMU, GPS system.

In some embodiments, the movable object is an unmanned aerial vehicle.

In some embodiments, the one or more actuators are motors of the movable object.

In another aspect of the present disclosure, a system for controlling a movable object is provided. The system includes: a memory comprising a pre-stored path that includes positional information for the movable object to follow, the said positional information including location information and orientation information of the movable object; a receiver for receiving a velocity profile for the movable object to follow while the movable object is following the pre-stored path; one or more sensing systems coupled to the movable object, said one or more sensing systems providing at least one signal indicative of a position of the movable object relative to the pre-stored path; and one or more actuators of the movable object, said one or more actuators configured to cause the movable object to follow the pre-stored path in accordance with the velocity profile in response to the at least one signal indicative of the position of the movable object.

In some embodiments, the pre-stored path is a path that the movable object has previously traveled and recorded. The velocity profile can include a velocity value that is different from a velocity of the movable object along the pre-stored path when the movable object previously traveled the pre-stored path.

In some embodiments, the pre-stored path is a reverse of a path that the movable object has previously traveled and recorded.

In some embodiments, the pre-stored path is a path template including one or more path parameters.

In some embodiments, the pre-stored path is a path inputted by a user.

In some embodiments, the pre-stored path is a loop that the movable object is capable of following repeatedly.

In some embodiments, the velocity profile includes a variable velocity over the pre-stored path.

In some embodiments, the velocity profile is inputted by a user.

In some embodiments, the velocity profile is altered while the movable object is following the pre-stored path.

In some embodiments, the movable object has a plurality of sensing systems using different types of sensors. The sensing system can include two or more of the following: vision sensing system, IMU, GPS system.

In some embodiments, the movable object is an unmanned aerial vehicle.

In some embodiments, the one or more actuators are motors of the movable object.

In another aspect, a method of controlling a velocity of a movable object is provided. The method includes: receiving, at a receiver, an instruction for movement of the movable object, said movement including translational movement and angular movement of the movable object; providing, in a memory, one or more velocity rules for the movable object to follow while the movable object is moving in response to the instruction for movement; receiving, from one or more sensing systems of the movable object, at least one signal indicative of a position of the movable object; and causing, with aid of one or more actuators of the movable object, the movable object to move in response to the instruction for movement in accordance with the velocity rules, based on the at least one signal indicative of the position of the movable object.

In some embodiments, receiving the instruction for movement of the movable object includes receiving an instruction provided from a remote control. Receiving the instruction provided from the remote control can include receiving a user inputted instruction for movement of the movable object into the remote control.

In some embodiments, receiving the instruction for movement of the movable object includes receiving an instruction provided from a memory comprising a pre-stored path for the movable object.

In some embodiments, providing the velocity rules includes providing a maximum velocity at which the movable object is permitted to move. Providing the maximum velocity can include providing a constant fixed velocity rate. Providing the maximum velocity can include calculating the maximum velocity based on the at least one signal indicative of the position of the movable object.

In some embodiments, providing the velocity rules includes providing a constant velocity at which the movable object is permitted to move. Providing the constant velocity can include providing a linear velocity or an angular velocity.

In some embodiments, the movable object has a plurality of sensing systems using different types of sensors. The sensing system can include two or more of the following: vision sensing system, IMU, GPS system.

In some embodiments, the movable object is an unmanned aerial vehicle.

In some embodiments, the one or more actuators are motors of the movable object.

In another aspect, a non-transitory computer readable medium containing program instructions for controlling a velocity of a movable object is provided. The computer readable medium includes: program instructions for receiving an instruction for movement of the movable object, said movement including translational movement and angular movement of the movable object; program instructions for providing one or more velocity rules for the movable object to follow while the movable object is moving in response to the instruction for movement; program instructions for analyzing at least one signal indicative of a position of the movable object; and program instructions for providing instructions to one or more actuators of the movable object to cause the movable object to move in response to the instruction for movement in accordance with the velocity rules, based on the at least one signal indicative of the position of the movable object.

In some embodiments, the program instructions for receiving the instruction for movement of the movable object include program instructions for receiving an instruction provided from a remote control. The program instructions for receiving the instruction provided from the remote control can include program instructions for receiving a user inputted instruction for movement of the movable object into the remote control.

In some embodiments, the program instructions for receiving the instruction for movement of the movable object include program instructions for receiving an instruction provided from a memory comprising a pre-stored path for the movable object.

In some embodiments, the program instructions for providing the velocity rules include program instructions for providing a maximum velocity at which the movable object is permitted to move. The program instructions for providing the maximum velocity can include program instructions for providing a constant fixed velocity rate. The program instructions for providing the maximum velocity can include program instructions for calculating the maximum velocity based on the at least one signal indicative of the position of the movable object.

In some embodiments, the program instructions for providing the velocity rules include program instructions for providing a constant velocity at which the movable object is permitted to move. The program instructions for providing the constant velocity can include program instructions for providing a linear velocity or an angular velocity.

In some embodiments, the movable object has a plurality of sensing systems using different types of sensors. The sensing system can include two or more of the following: vision sensing system, IMU, GPS system.

In some embodiments, the movable object is an unmanned aerial vehicle.

In some embodiments, the one or more actuators are motors of the movable object.

In another aspect, a system for controlling a velocity of a movable object is provided. The system includes: a receiver for receiving an instruction for movement of the movable object, said movement including translational movement and angular movement of the movable object; a memory storing one or more velocity rules for the movable object to follow while the movable object is moving in response to the instruction for movement; one or more sensing systems coupled to the movable object, said one or more sensing systems providing at least one signal indicative of a apposition of the movable object; and one or more actuators of the movable object, said one or more actuators configured to cause the movable object to move in response to the instruction for movement in accordance with the velocity rules, based on the at least one signal indicative of the position of the movable object.

In some embodiments, the instruction for movement of the movable object is provided from a remote control. The instructions for movement of the movable object can be input by a user into the remote control.

In some embodiments, the instruction for movement of the movable object is provided from a memory comprising a pre-stored path for the movable object.

In some embodiments, the velocity rules include a maximum velocity at which the movable object is permitted to move. The maximum velocity can be a constant fixed velocity rate. The maximum velocity can be calculated based on the at least one signal indicative of the position of the movable object.

In some embodiments, the velocity rules include a constant velocity at which the movable object is permitted to move. The constant velocity can be a linear velocity. The constant velocity can be an angular velocity.

In some embodiments, the movable object has as plurality of sensing systems using different types of sensors. The sensing system can include two or more of the following: vision sensing system, IMU, GPS system.

In some embodiments, the movable object is an unmanned aerial vehicle.

In some embodiments, the one or more actuators are motors of the movable object.

In another aspect, a method of displaying a flight trajectory of an unmanned aerial vehicle is provided. The method includes: receiving, from one or more sensing systems of the unmanned aerial vehicle, at least one signal indicative of a position of the unmanned aerial vehicle, the position of the unmanned aerial vehicle including an unmanned aerial vehicle location and an unmanned aerial vehicle orientation; and displaying in real-time, on a user interface of a terminal remote to the unmanned aerial vehicle, the unmanned aerial vehicle location in a three-dimensional coordinate system and the unmanned aerial vehicle orientation via a visual indicator in response to the at least one signal.

In some embodiments, receiving the at least one signal includes receiving at least one signal from a plurality of sensing systems using different types of sensors. Receiving the at least one signal can include receiving at least one signal from two or more of the following: stereo vision sensing system, IMU, GPS system.

In some embodiments, receiving the at least one signal includes receiving at least one signal from one or more sensing systems rigidly coupled to the unmanned aerial vehicle.

In some embodiments, the method further includes receiving, at the terminal, an input from a user to control movement of the unmanned aerial vehicle.

In some embodiments, the terminal is a handheld object.

In some embodiments, the method includes displaying the position of the unmanned aerial vehicle on a touchscreen of the terminal.

In some embodiments, displaying the visual indicator includes displaying an arrow indicative of a direction that a payload of the unmanned aerial vehicle is facing.

In some embodiments, displaying the unmanned aerial vehicle orientation includes displaying an arrow indicative of a direction in which the unmanned aerial vehicle is positioned to move.

In some embodiments, the distance between shafts of opposite rotors of the unmanned aerial vehicle has dimensions ranging from 5 cm to 5 m.

In some embodiments, the unmanned aerial vehicle is a rotorcraft.

In some embodiments, the method further includes receiving an input from a user to adjust the orientation of the three-dimensional coordinate system, and adjusting the visual indicator indicative of the unmanned aerial vehicle orientation correspondingly.

In another aspect, a non-transitory computer readable medium containing program instructions for displaying a flight trajectory of an unmanned aerial vehicle is provided. The computer readable medium includes: program instructions for analyzing at least one signal indicative of a position of the unmanned aerial vehicle from one or more sensing systems of the unmanned aerial vehicle, the position of the unmanned aerial vehicle including an unmanned aerial vehicle location and an unmanned aerial vehicle orientation; and program instructions for displaying in real-time, on a user interface of a terminal remote to the unmanned aerial vehicle, the unmanned aerial vehicle location in a three-dimensional coordinate system and the unmanned aerial orientation via a visual indicator in response to the at least one signal.

In some embodiments, the program instructions for analyzing the at least one signal include program instructions for analyzing at least one signal from a plurality of sensing systems using different types of sensors. The program instructions for analyzing the at least one signal can include program instructions for analyzing at least one signal from two or more of the following: stereo vision sensing system, IMU, GPS system.

In some embodiments, the program instructions for analyzing the at least one signal include program instructions for analyzing at least one signal from one or more sensing systems rigidly coupled to the unmanned aerial vehicle.

In some embodiments, the computer readable medium further includes program instructions for receiving, at the terminal, an input from a user to control movement of the unmanned aerial vehicle.

In some embodiments, the terminal is a handheld object.

In some embodiments, the computer readable medium includes program instructions for displaying the position of the unmanned aerial vehicle on a touchscreen of the terminal.

In some embodiments, the program instructions for displaying the visual indicator include program instructions for displaying an arrow indicative of a direction that a payload of the unmanned aerial vehicle is facing.

In some embodiments, the program instructions for displaying the unmanned aerial vehicle orientation includes program instructions for displaying an arrow indicative of a direction in which the unmanned aerial vehicle is positioned to move.

In some embodiments, the distance between shafts of opposite rotors of the unmanned aerial vehicle has dimensions ranging from 5 cm to 5 m.

In some embodiments, the unmanned aerial vehicle is a rotorcraft.

In some embodiments, the computer readable medium further includes program instructions for receiving an input from a user to adjust the orientation of the three-dimensional coordinate system, and program instructions for adjusting the visual indicator indicative of the unmanned aerial vehicle orientation correspondingly.

In another aspect, a system for displaying a flight trajectory of an unmanned aerial vehicle is provided. The system includes: one or more sensing systems coupled to the unmanned aerial vehicle, providing at least one signal indicative of a position of the unmanned aerial vehicle, the position of the unmanned aerial vehicle including an unmanned aerial vehicle location and an unmanned aerial vehicle orientation; and a terminal remote to the UAV including a user interface showing the unmanned aerial vehicle location in a three-dimensional coordinate system and the unmanned aerial vehicle orientation via a visual indicator in response to the at least one signal.

In some embodiments, the unmanned aerial vehicle has as plurality of sensing systems using different types of sensors. The sensing system can include two or more of the following: stereo vision sensing system, IMU, GPS system.

In some embodiments, the one or more sensing systems are rigidly coupled to the unmanned aerial vehicle.

In some embodiments, input from a user to control movement of the unmanned aerial vehicle can further be received at the terminal.

In some embodiments, the terminal is a handheld object.

In some embodiments, the position of the unmanned aerial vehicle is displayed on a touchscreen of the terminal.

In some embodiments, the visual indicator of the unmanned aerial vehicle orientation is an arrow indicative of a direction that a payload of the unmanned aerial vehicle is facing.

In some embodiments, the visual indicator of the unmanned aerial vehicle orientation is an arrow indicative of a direction in which the unmanned aerial vehicle is positioned to move.

In some embodiments, the distance between shafts of opposite rotors of the unmanned aerial vehicle has dimensions ranging from 5 cm to 5 m.

In some embodiments, the unmanned aerial vehicle is a rotorcraft.

In some embodiments, an input from a user can further be received to adjust the orientation of the three-dimensional coordinate system, and adjust the visual indicator indicative of the unmanned aerial vehicle orientation correspondingly.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
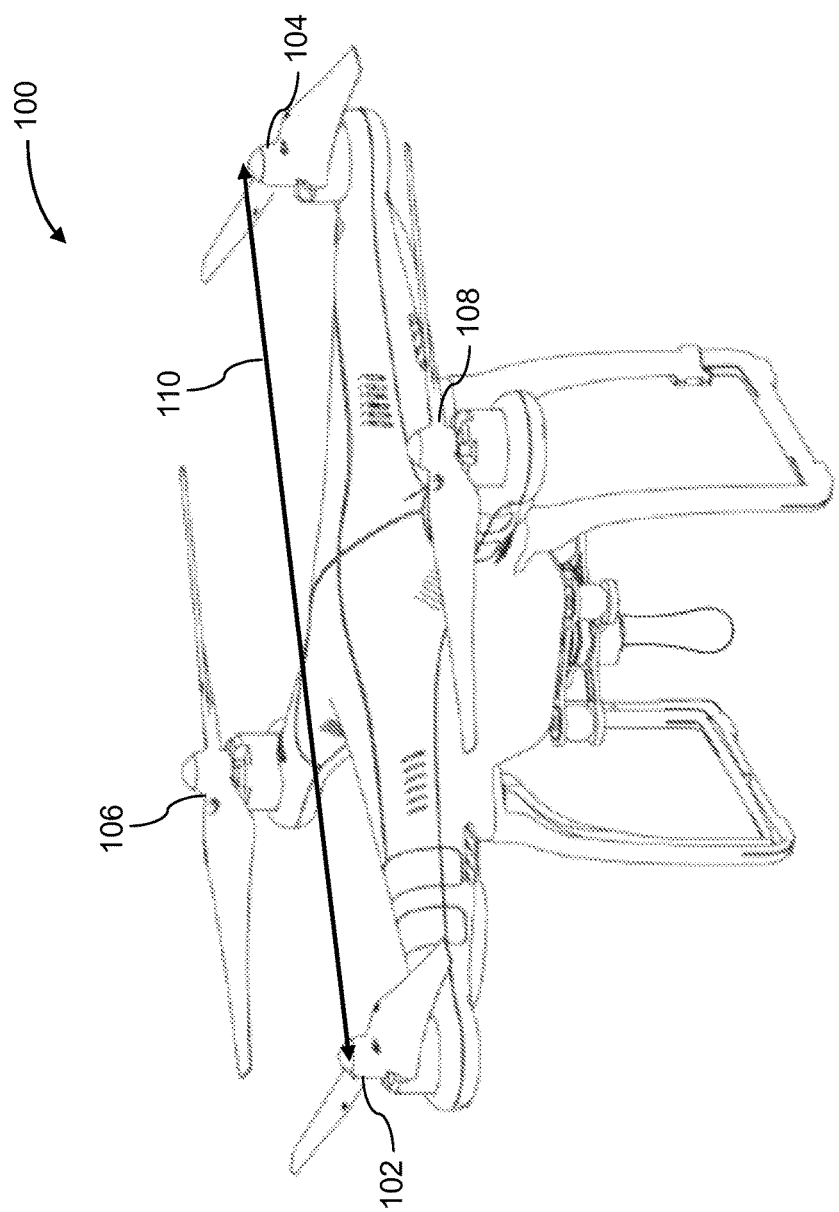
FIG. 1 illustrates an unmanned aerial vehicle, in accordance with embodiments of the present invention.

The present invention provides systems, methods, and devices for collecting positional and/or motion information for a movable object. The systems, methods, and devices described herein can be used to control a movable object (e.g., with respect to position, velocity, and/or acceleration). Additionally, the systems, methods, and devices described herein can be used to display information relating to the movable object (e.g., a flight trajectory of the movable object). It shall be understood that different aspects of the invention can be appreciated individually, collectively, or in combination with each other. Various aspects of the invention described herein may be applied to any of the particular applications set forth below or for any other types of movable objects.

The systems, methods, and devices disclosed herein can be applied to any suitable movable object. The movable object can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle or a train), in space (e.g., a spaceplane, a satellite, or a probe), or any combination of these environments. The movable object can be a vehicle, such as a vehicle described elsewhere herein. In some embodiments, the movable object can be a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle such as an aerial vehicle can be self-propelled, such as self-propelled through the air, on or in water, in space, or on the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can be controlled remotely by a user or controlled locally by an occupant within or on the movable object. In some embodiments, the movable object is an unmanned movable object, such as an unmanned aerial vehicle (UAV). An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

FIG. 1 illustrates an example of a movable object which may be an unmanned aerial vehicle (UAV) 100, in accordance with embodiments of the present invention. The UAV 100 can include a propulsion system having four rotors 102, 104, 106, and 108. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 110. For example, the length 110 can be less than or equal to 2 m, or less than equal to 5 m. In some embodiments, the length 110 can be within a range from 40 cm to 1 m, from 10 cm to 2 m, or from 5 cm to 5 m. As previously mentioned, any description pertaining to an aerial vehicle such as a UAV may apply to any other type of movable object, and vice-versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Figure 2:
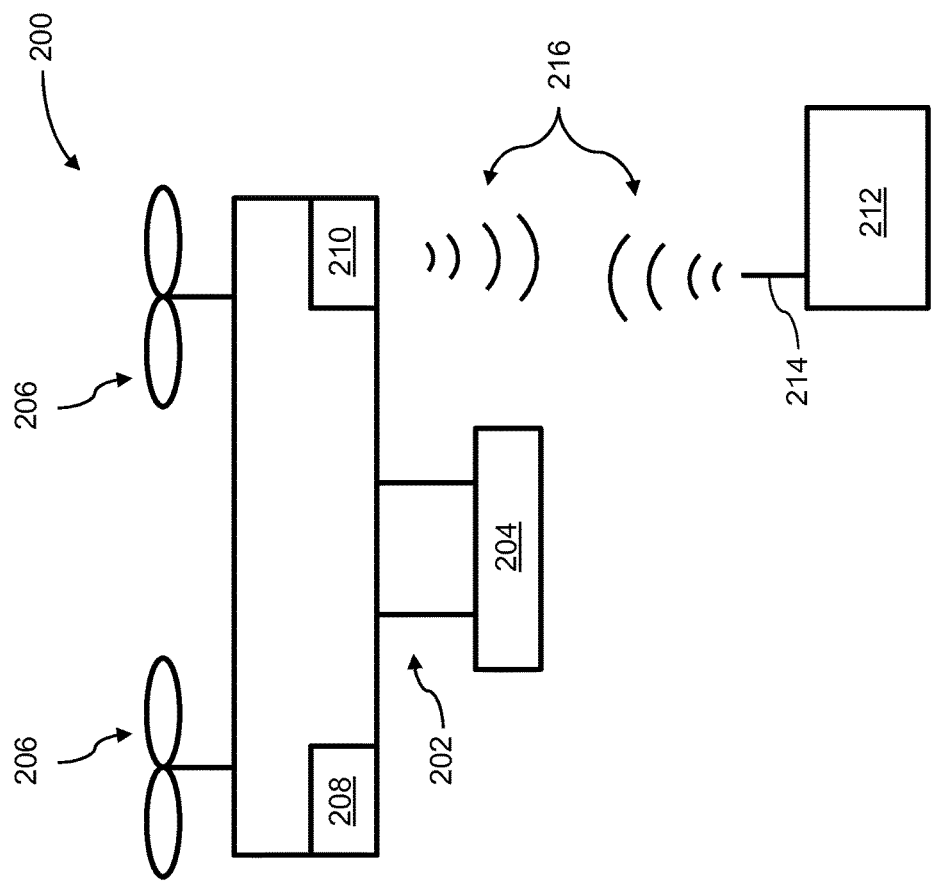
FIG. 2 illustrates a movable object including a carrier and a payload, in accordance with embodiments of the present invention.

FIG. 2 illustrates a movable object 200 including a carrier 202 and a payload 204, in accordance with embodiments. Although the movable object 200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV).

In some instances, the payload 204 may be provided on the movable object 200 without requiring the carrier 202. The movable object 200 may include propulsion mechanisms 206, a sensing system 208, and a transceiver 210. The propulsion mechanisms 206 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 206 can enable the movable object 200 to take off vertically from a surface or land vertically on a surface without requiring any horizontal movement of the movable object 200 (e.g., without traveling down a runway). Optionally, the propulsion mechanisms 206 can be operable to permit the movable object 200 to hover in the air at a specified position and/or orientation.

For example, the movable object 200 can have multiple horizontally oriented rotors that can provide lift and/or thrust to the movable object. The multiple horizontally oriented rotors can be actuated to provide vertical takeoff, vertical landing, and hovering capabilities to the movable object 200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 200 (e.g., with respect to up to three degrees of translation and up to three degrees of rotation).

The sensing system 208 can include one or more sensors that may sense the spatial disposition, velocity, and/or acceleration of the movable object 200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 208 can be used to control the spatial disposition, velocity, and/or orientation of the movable object 200 (e.g., using a suitable processing unit and/or control module, as described below). Alternatively, the sensing system 208 can be used to provide data regarding the environment surrounding the movable object, such as weather conditions, proximity to potential obstacles, location of geographical features, location of manmade structures, and the like.

The transceiver 210 enables communication with terminal 212 having a transceiver 214 via wireless signals 216. In some embodiments, the communication can include two-way communication, with the terminal 212 providing control commands to one or more of the movable object 200, carrier 202, and payload 204, and receiving information from one or more of the movable object 200, carrier 202, and payload 204 (e.g., position and/or motion information of the movable object, carrier or payload; data sensed by the payload such as image data captured by a payload camera). In some instances, control commands from the terminal may include instructions for relative positions, movements, actuations, or controls of the movable object, carrier and/or payload. For example, the control command may result in a modification of the location and/or orientation of the movable object (e.g., via control of the propulsion mechanisms 206), or a movement of the payload with respect to the movable object (e.g., via control of the carrier 202). The control command from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 208 or of the payload 204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control commands provided transmitted by the terminal 212 can be configured to control a state of one or more of the movable object 200, carrier 202, or payload 204. Alternatively or in combination, the carrier 202 and payload 204 can also each include a transceiver configured to communicate with terminal 212, such that the terminal can communicate with and control each of the movable object 200, carrier 202, and payload 204 independently.

Sensing System

In some embodiments, a movable object can include a sensing system configured to provide information regarding a state of the movable object (e.g., position, velocity, and/or acceleration with respect to one to six degrees of freedom; propulsion state of the movable object; whether a payload of the movable object is turned on or off; a mode of operation of the payload; whether the payload is zoomed in or out) or any other object (e.g., carrier, payload). The information can be transmitted to a terminal to be displayed to a user. Additionally, the information can be transmitted to a processing unit of the terminal to enable control of the movable object. For example, the information can include positional information for the movable object indicating a three-dimensional (3D) spatial disposition of the object relative to a fixed reference frame or a moving reference frame. The positional information can include location information (e.g., altitude, latitude, and longitude) and orientation information (e.g., roll angle, pitch angle, and yaw angle). Alternatively or in combination, the information can include motion information regarding the velocity and/or acceleration of the movable object with respect to one or more of the six degrees of freedom.

Any suitable combination of sensing systems can be used, such as combinations of the embodiments described herein. In some embodiments, the sensing systems each include a sensor adapted to receive a sensing signal that can be analyzed to provide positional and/or motion information of the movable object. The sensing signal can be indicative of one or more of a position, orientation, velocity, or acceleration of the movable object.

Figure 3:
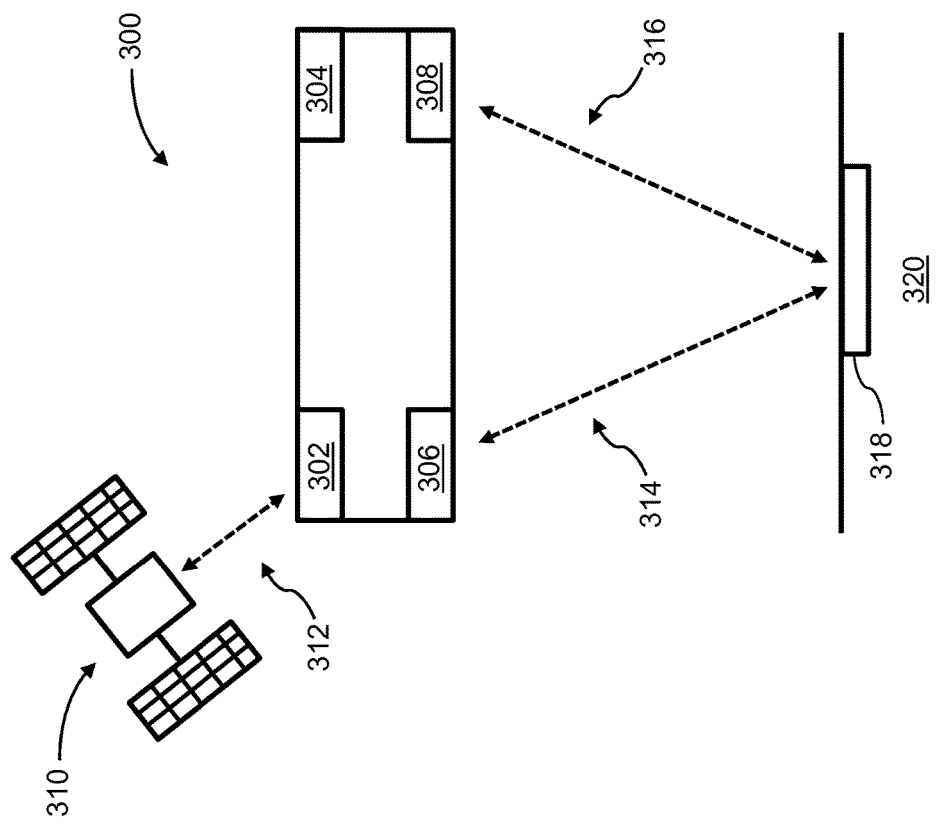
FIG. 3 illustrates a movable object with a plurality of sensing systems, in accordance with embodiments of the present invention.

FIG. 3 illustrates a movable object 300 with a plurality of sensing systems, in accordance with embodiments of the present invention. The sensing systems of movable object 300 can include a GPS sensor 302, an inertial measurement unit (IMU) 304, and/or first and second vision sensors 306, 308. The sensing data produced by the sensing systems can be used to provide positional information that can be used to control and/or navigate the movable object 300.

The GPS sensor 302 can communicate with one or more GPS satellites 310 to obtain one or more GPS data signals 312. The GPS sensor 302 can be rigidly coupled to the movable object 300 such that the position of the GPS sensor 302 corresponds to the position of the movable object 300. Alternatively the GPS sensor 302 can be permitted to move relative to the movable object 300 with respect to up to six degrees of freedom. The GPS sensor 302 can be directly mounted onto the movable object 300, or coupled to a support structure mounted onto the movable object 300. In some instances, the support structure may include a load, such as a carrier or payload. The GPS sensor 302 may be provided exterior to or within a housing of the movable object. The GPS sensor 302 may be permanently or removably attached to the movable object. In some embodiments, the GPS sensor 302 can be an element of a payload of the movable object 300.

The GPS signals received by the GPS sensor 302 can be processed to determine the position of the movable object 300 relative to a global reference frame (e.g., latitude, longitude, and altitude), and thereby determine the translational velocity and/or acceleration of the movable object. The GPS sensor 302 can utilize any suitable GPS technology, such as differential GPS (DGPS) or real time kinematic (RTK) GPS. The GPS sensor 302 can be configured to determine the position of the movable object 300 to any suitable level of accuracy, such as meter-level accuracy (e.g., within 10 m, 5 m, 2 m, or 1 m of accuracy) or centimeter-level accuracy (within 500 cm, 200 cm, 100 cm, 50 cm, 20 cm, 10 cm, or 5 cm of accuracy).

The IMU 304 can include one or more accelerometers, one or more gyroscopes, one or more magnetometers, or suitable combinations thereof. For example, the IMU 304 can include up to three orthogonal accelerometers to measure linear acceleration of the movable object along up to three axes of translation, and up to three orthogonal gyroscopes to measure the angular acceleration about up to three axes of rotation. The IMU 304 can be rigidly coupled to the movable object 300 such that the motion of the movable object 300 corresponds to motion of the IMU 304. Alternatively the IMU 304 can be permitted to move relative to the movable object 300 with respect to up to six degrees of freedom. The IMU 304 can be directly mounted onto the movable object 300, or coupled to a support structure mounted onto the movable object 300. The IMU 304 may be provided exterior to or within a housing of the movable object. The IMU may be permanently or removably attached to the movable object. In some embodiments, the IMU 304 can be an element of a payload of the movable object 300. The IMU 304 can provide a signal indicative of the motion of the movable object 300, such as a position, orientation, velocity, and/or acceleration of the movable object 300 (e.g., with respect to one, two, or three axes of translation, and/or one, two, or three axes of rotation). For example, the IMU 304 can sense a signal representative of the acceleration of the movable object, and the signal can be integrated once to provide velocity information, and twice to provide location and/or orientation information.

The vision sensors 306, 308 of the movable object 300 can be any suitable device for receiving optical signals 314, 316 from a target 318 within the surrounding environment (e.g., the ground 320) that can be processed to generate image data of the target 318. The vision sensors 306, 308 can be rigidly coupled to the movable object 300, such that the positional information obtained by the vision sensors 306, 308 corresponds to the positional information of the movable object 300. Alternatively the vision sensors 306, 308 can be permitted to move relative to the movable object 300 with respect to up to six degrees of freedom. The vision sensors 306, 308 can be directly mounted onto the movable object 300, or coupled to a support structure mounted onto the movable object 300. In some embodiments, the vision sensors 306, 308 can be an element of a payload of the movable object 300. Any suitable number of vision sensors can be used, such as a single vision sensor, a pair of vision sensors, three vision sensors, four vision sensors, or any other number of vision sensors. For example, the vision sensors 306, 308 can be a pair of cameras (e.g., binocular cameras). Alternatively, a single camera (e.g., a monocular camera) can be used. In some embodiments, the vision sensors are laterally spaced apart on the movable object 300 such that each vision sensor provides an image from a different camera viewpoint, thereby enabling stereo vision imaging. For example, the vision sensors can be separated laterally by up to 1 m, 500 cm, 250 cm, 100 cm, 50 cm, 25 cm, 10 cm, 5 cm, 2 cm, or 1 cm. The vision sensors can be disposed on the same side of the movable object or opposite sides of the movable object. One or more vision sensors can be disposed on the front, rear, top, bottom, or lateral sides of the movable object, or suitable combinations thereof.

The vision sensors 306, 308 can be used to simultaneously capture images at a specified frequency to produce a time series of image data. The time series of image data obtained from the vision sensors 306, 308 can be processed to determine the position, orientation, and/or velocity of the movable object 300 using any suitable method, such as a machine vision algorithm. For example, a machine vision algorithm can be used to identify one or more feature points within each image (e.g., an edge of an object, a corner of an object, or a boundary between objects of two different colors). Any suitable method or combination of methods can be used to identify and provide a digital representation of the feature points, such as the features from accelerated segment test (FAST) algorithm or the binary robust independent elementary features (BRIEF) algorithm. The image data can then be matched to each other to identify a set of common feature points appearing in images obtained by both vision sensors. The motion of the movable object 300 can be determined based on the common feature points and the spatial disposition of the vision sensors 306, 308 relative to the movable object 300 and to each other.

Although not depicted in FIG. 3, the movable object 300 can also include a proximity sensing system configured to provide positional information for the movable object 300. Any proximity sensor capable of measuring the distance between the movable object 300 and one or more surrounding objects can be used. For example, the proximity sensing system can include an ultrasonic sensor and/or a lidar sensor. In some embodiments, the proximity sensor can be rotated (e.g., rotated 360°) to obtain distance and position information for a plurality of objects surrounding the movable object 300. The distance and position information for the surrounding objects can be analyzed to determine the spatial disposition and/or motion of the movable object 300.

Figure 4:
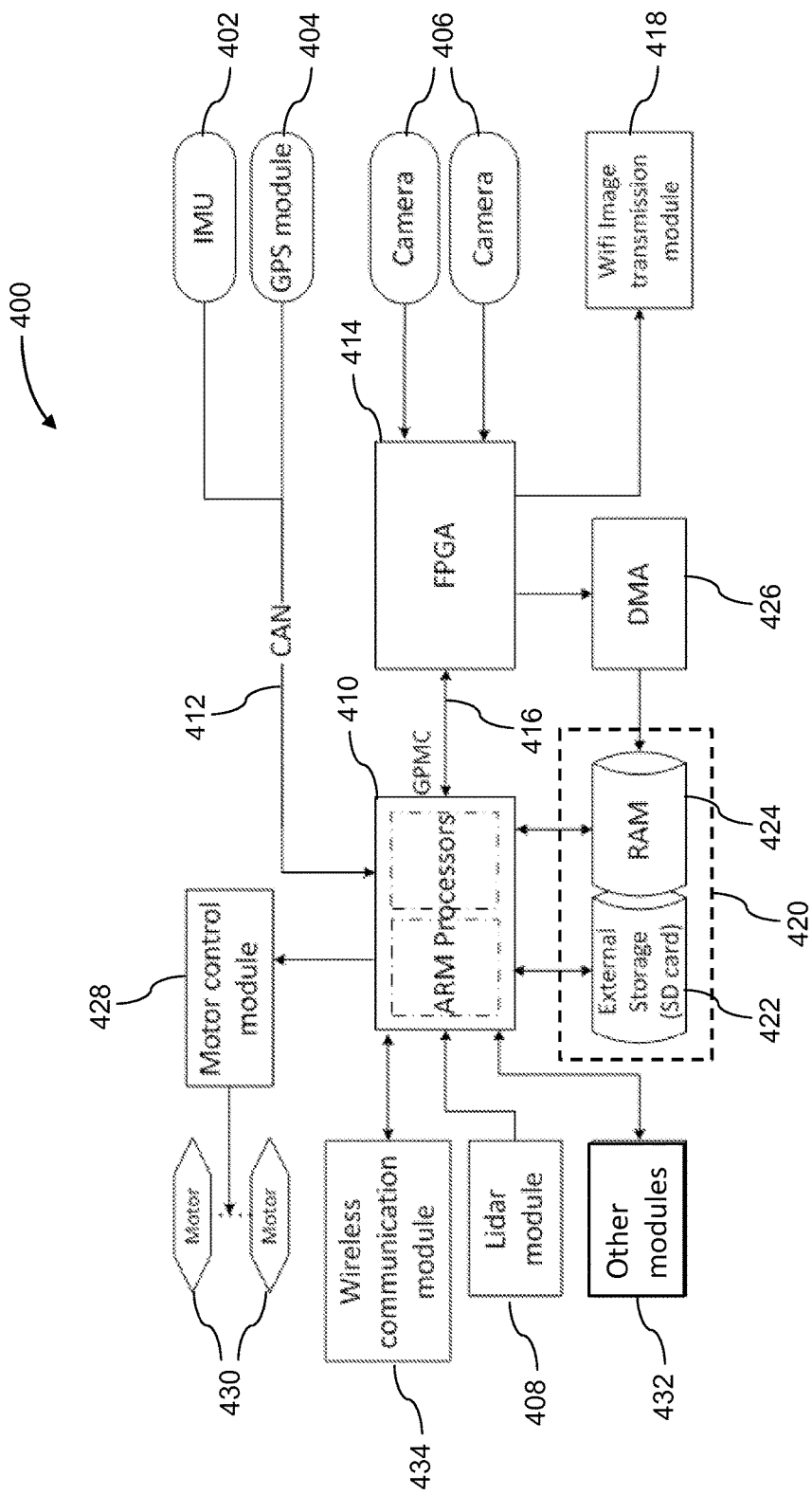
FIG. 4 is a schematic illustration by way of block diagram of a system for collecting positional information for a movable object, in accordance with embodiments of the present invention.

FIG. 4 is a schematic illustration by way of block diagram of a system 400 for collecting positional and/or motion information for a movable object using a plurality of sensing systems, in accordance with embodiments of the present invention. The system 400 can be used in combination with any suitable embodiment of the systems, methods, or devices disclosed herein. The system 400 can include a plurality of sensing systems or modules as described herein. The sensing systems can be different types of sensing systems that collect information relating to the movable object in different ways. Different types of sensing systems may sense different types of signals or signals from different sources. For example, the sensing systems can include an IMU 402, GPS sensor module 404, a plurality of cameras 406, and a proximity sensing module 408 (e.g., a lidar module).

The IMU 402 and the GPS sensor module 404 can be operatively coupled to a processing unit 410 having a plurality of processors (e.g., ARM processors), such as through a controller area network (CAN) connection 412. The proximity sensing module 408 can be operatively coupled to the processor unit 410. The cameras 406 can be operatively coupled to the processing unit 410. In some embodiments, the cameras 406 can be operatively coupled to a field programmable gate array (FPGA) 414. The FPGA 414 can be operatively coupled to the processing unit 410 (e.g., via a general purpose memory controller (GPMC) connection 416). An image transmission module 418 (e.g., a Wi-Fi image transmission module) can be operatively coupled to the cameras 406, such as through FPGA 414. The image transmission module 418 can be used to transmit images captured by the cameras 406 to any suitable external device or system, such as a terminal as described herein.

The processing unit 410 can be a programmable processor (e.g., a central processing unit (CPU)). The processing unit 410 can be operatively coupled to a non-transitory computer readable medium 420. The non-transitory computer readable medium can include one or more memory units (e.g., removable media or external storage such as an SD card 422, random access memory (RAM) 424). In some embodiments, data from the cameras 406 can be directly conveyed to and stored within the memory units of the non-transitory computer readable medium 420 (e.g., through a direct memory access (DMA) controller 426). The memory units of the non-transitory computer readable medium 420 can include code and/or program instructions executable by the processing unit 410 to perform any suitable embodiment of the methods described herein. For example, the processing unit 410 can be configured to execute instructions causing one or more processors of the processing unit 410 to analyze data produced by one or more sensing systems (e.g., IMU 402, GPS sensor module 404, cameras 406, proximity sensing module 408) to determine positional and/or motion information for the movable object, as described herein. The memory units can store sensing data from the one or more sensing systems to be processed by the processing unit 410. In some embodiments, the memory units of the non-transitory computer readable medium 420 can store the positional and/or motion information of the movable object determined by processing the sensing data. Alternatively or in combination, the memory units of the non-transitory computer readable medium 420 can store predetermined or pre-stored data for controlling the movable object (e.g., a predetermined flight path, velocity profile, or velocity rule).

In some embodiments, the processing unit 410 can be operatively coupled to a control module 428 configured to control a state of the movable object. For example, the control module 428 is depicted in FIG. 4 as an actuation mechanism control module operable to the control the actuators or motors 430 of the movable object to adjust the spatial disposition of the movable object with respect to six degrees of freedom. Alternatively or in combination, the control module 428 can adjust the velocity or acceleration of the movable object with respect to six degrees of freedom. In some embodiments, the control module 428 can control the movable object based on predetermined control data or positional and/or motion information for the movable object obtained by processing data from one or more sensing systems, as described herein. The processing unit can be operatively coupled to one or more other modules 432, such as a module configured to control one or more of a state of a carrier, payload, or sensing system.

The processing unit 408 can be operatively coupled to a communication module 434 configured to transmit and/or receive data from one or more external devices (e.g., a terminal, display device, or other remote controller). Any suitable means of communication can be used, such as wired communication or wireless communication. For example, the communication module 434 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 434 can transmit and/or receive one or more of sensing data from the sensing systems, positional and/or motion information determined by processing the sensing data, predetermined control data, user commands from a terminal or remote controller, and the like.

The components of the system 400 can be arranged in any suitable configuration. For example, one or more of the components of the system 400 can be located on the movable object, carrier, payload, terminal, sensing system, or an additional external device in communication with one or more of the above. Additionally, although FIG. 4 depicts a single processing unit 410 and a single non-transitory computer readable medium 422, one of skill in the art would appreciate that this is not intended to be limiting, and that the system 400 can include a plurality of processing units and/or non-transitory computer readable media. In some embodiments, one or more of the plurality of processing units and/or non-transitory computer readable media can be situated at different locations, such as on the movable object, carrier, payload, terminal, sensing system, additional external device in communication with one or more of the above, or suitable combinations thereof, such that any suitable aspect of the processing and/or memory functions performed by the system 400 can occur at one or more of the aforementioned locations.

Motion and/or Position Estimation Using Sensor Fusion

In some instances, the performance of conventional individual sensing system can be less than ideal. For example, GPS sensing systems require line of sight to a plurality of GPS satellites, and can therefore be limited when used in poor weather conditions, indoor environments, or near buildings. Additionally, although DGPS and RTK GPS demonstrate improved accuracy compared to conventional GPS, these technologies can be associated with various restrictions that limit their applicability in some instances. IMU sensing systems, for example, can be less accurate for sensing complex movements (e.g., simultaneous fast translation and rotation). Additionally, IMU sensing systems can accumulate integration errors over time. Vision sensing systems, for example, can require significant amounts of computation. Furthermore, the accuracy of vision sensing systems can be influenced by image quality, such that low image resolution, image blurring (e.g., due to rapid movement), and image distortion can reduce the performance of such systems. Proximity sensing systems, for example, can be limited by sensor accuracy and usage range, as long range sensors can be too large for use in some applications. Additionally, lidar sensors can exhibit reduced performance under strong sunlight conditions.

In order to reduce measurement inaccuracies caused by any potential shortcomings of a single sensing system, the spatial disposition and/or motion of the movable object can be determined based on data received from a plurality of sensing systems, such as sensing systems of different types. The sensor fusion described herein makes use of the advantages of each sensor type while compensating for measurement inaccuracies from any single sensing system. Consequently, improved estimates of the motion and/or position of the movable object can be achieved in a wide variety of environments. Any suitable number and type of sensing systems can be used for the sensor fusion methods described herein. For example, a three-way sensor fusion of a GPS sensing system, an IMU sensing system, and a machine vision sensing system, can be performed. Alternatively, a two-way sensor fusion can be performed (e.g., GPS and IMU, GPS and vision, GPS and proximity, IMU and vision, IMU and proximity, or vision and proximity). Alternatively, data received from a plurality of sensing systems can be sequentially fused over multiple sensor fusion steps in any suitable order (e.g., GPS is fused with IMU, then vision is fused with GPS and IMU). The methods for sensor fusion described herein can be applied to determine positional and/or motion information for any suitable movable object, such as embodiments of the systems and devices described herein.

Figure 5:
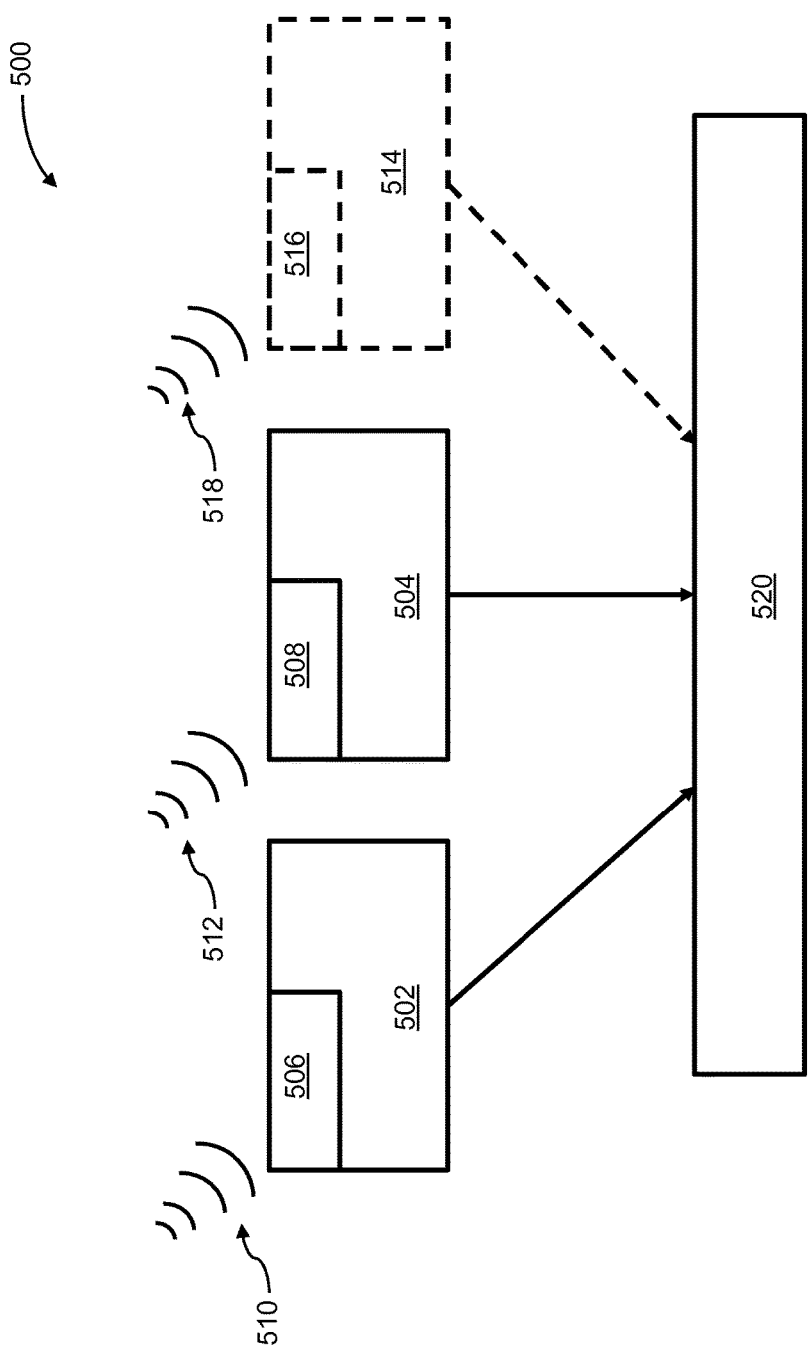
FIG. 5 is a schematic illustration by way of block diagram of a sensor fusion system for determining positional and/or motion information for a movable object, in accordance with embodiments of the present invention.

FIG. 5 is a schematic illustration of by way of block diagram of a sensor fusion system 500 for determining positional and/or motion information for a movable object, in accordance with embodiments of the present invention. The system 500 can be combined with any suitable embodiment of the systems, methods, and devices described herein. The system 500 includes first and second sensing systems 502 and 504, with respective sensors 506 and 508 configured to receive respective sensing signals 510 and 512. Any suitable number of optional sensing systems can also be provided, such as a third sensing system 514 including a sensor 516 for receiving a signal 518. The sensing data from the sensing systems can be transmitted to a sensor fusion module 520. The sensor fusion module 520 can include portions disposed on one or more of the movable object, payload, carrier, terminal sensing system, or additional external device. In some embodiments, the sensor fusion module 520 can be local to the sensing systems, or remote from the sensing systems. The sensor fusion module 520 can include one or more processors configured to determine the 3D spatial disposition and/or motion of the movable object based on the sensing data received from the sensing system. The sensor fusion module 520 can use any suitable sensor fusion method to determine the spatial disposition and/or motion. For example, the sensor fusion method can include an algorithm based on a Kalman filter, an extended Kalman filter (EKF), an unscented Kalman filter (UKF), a particle filter (PF), or suitable combinations thereof.

In some embodiments, the sensor fusion algorithm can exclude sensing data from one or more of the sensing systems from the sensor fusion analysis. Any suitable parameter can be used to determine whether to exclude sensing data from a sensing system. In some embodiments, the parameter can include sensor signal strength, sensor type, a state of the movable object, or the surrounding environment. The sensor signal strength can be dependent on one or more of sensor signal magnitude, number of sensing signals received by a sensing system. For example, the sensor can be a GPS sensor, and the GPS signal strength can be dependent on one or more of the number of GPS sensing signals received (e.g., from different GPS satellites) or the magnitude of a GPS signal (e.g., as determined by the power of the signal). In some embodiments, the sensor fusion module 520 can compare the sensor signal strength to a threshold value to determine whether the sensor signal strength exceeds the threshold value. If the sensor signal strength exceeds the threshold value, the corresponding sensing data can be used in the sensor fusion analysis. If the sensor signal strength does not exceed the threshold value, the corresponding sensing data can be excluded from the sensor fusion analysis. The threshold value can be a predetermined value (e.g., input by a user). Alternatively, the threshold value can be dynamically determined (e.g., based on one or more dynamically changing parameters, such as a state of the movable object). In some embodiments, the threshold value can be set to be greater than a minimum signal strength of a sensor that enables the corresponding sensing system to operate.

In some embodiments, one or more weight values can be determined for one or more sensing systems such that the sensor fusion algorithm factors in the one or more weight values when determining the spatial disposition and/or motion based on the corresponding sensing data. The weight value can be determined by the sensor fusion module 520 based on any suitable parameter, such as one or more of sensor signal strength or magnitude, number of sensing signals received by a sensing system, sensor type, or a state of the movable object. For example, for a GPS sensing system, the weight value can be determined based on GPS signal strength (e.g., signal strength depending on the number and/or magnitude of the GPS signals as described above), with a higher weight value when the signal strength is high and a lower weight value when the signal strength is low. In some embodiments, a weight value can be determined for a vision sensing system, such that the weight value is based on a parameter indicative of the accuracy of a machine vision algorithm used to analyze vision sensing data, as described in detail below. For example, for the vision sensing system, the weight value can be lower when the movable object is in an environment in which machine vision-based navigation is less reliable (e.g., at high altitudes or above water).

In some embodiments, the weight value can be a numerical value (e.g., ranging from 0 to 1). The weight value can encompass a continuous range of values or a discrete set of values. For example, the weight value can be mathematically related to one or more suitable parameters, such as through a linear, nonlinear, polynomial, exponential, or logarithmic correlation. Optionally, one or more weight values can be predetermined or selected from a pre-set value, based on user input. Any suitable number of sensing systems can be weighted, such as a single sensing system or multiple sensing systems. One or more sensing systems can share the same weight value, or each sensing system can have a different respective weight value. Optionally, some sensing systems can be unweighted. In some embodiments, the sensor fusion module 520 can calculate the positional and/or motion information of the movable object based on sensing data from a suitable combination of weighted and unweighted sensing systems, such that the weight value is factored in for the sensing data from the weighted sensing systems. In one example a first sensing system and a second sensing system may be provided. The data from the first sensing system may be combined with a weight value factored in with the data from the second sensing system. In another example, data from the first sensing system may be weighted and combined with a weighted value from the second sensing system. One or more additional sensing systems (e.g., third sensing system, fourth sensing system) can be provided whose data may or may not be weighted. In some instances, weighting for a sensing system may be considered if sensor data can be compromised based on detectable conditions (e.g., signal strength).

Figure 6:
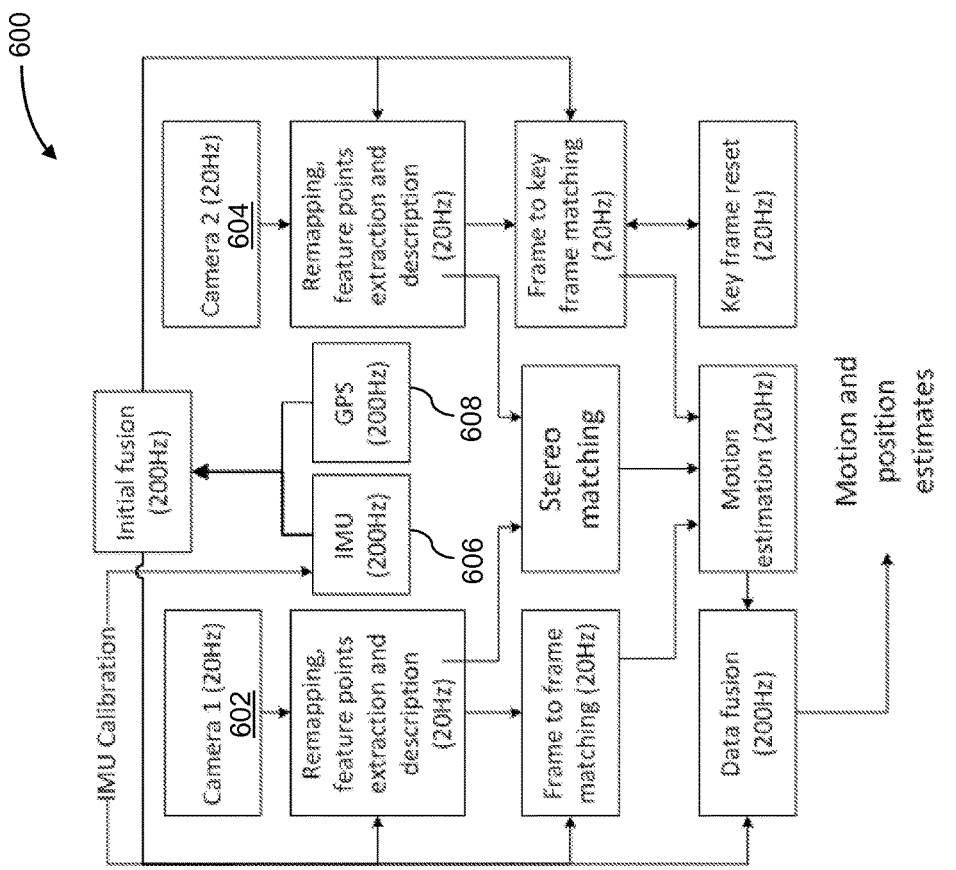
FIG. 6 is a flow chart illustrating a sensor fusion algorithm for state estimation of positional and/or motion information for a movable object, in accordance with embodiments of the present invention.

FIG. 6 is a flow chart illustrating a sensor fusion algorithm 600 for state estimation of positional and/or motion information for a movable object, in accordance with embodiments of the present invention. Any suitable system or device can be used to apply the algorithm 600, such as the embodiments described herein. In some embodiments, the algorithm can be used to fuse sensing data from a pair of binocular cameras 602, 604, an IMU 606, and a GPS 608.

In the algorithm 600, a pair of images can be recorded simultaneously by the cameras 602, 604 (hereinafter an "image frame"). The algorithm 600 can be repeated each time an image frame is obtained in order to obtain the speed and position of the cameras 602, 604 relative to the starting position when the image frame was taken. Each time, the algorithm 600 can determine the relative positional change since the previous measurement time point, denoted as (R, T), where R is a rotation matrix representing the change in orientation of the movable object relative to the previous time point, T is a motion vector representing the change in position of the movable object in 3D space relative to the previous time point.

Raw image data obtained by the cameras 602, 604 can be processed by image analysis to correct the image data, for example, by implementing an algorithm to correct optical distortion and/or noise in the image data. The image analysis can extract suitable feature points from the corrected image data and generate a digital representation of the feature points, as previously described herein.

In some embodiments, frame-to-frame matching of the feature points produced by the image analysis can be performed using an initial estimation of the positional change, thereby reducing the complexity of the search and improving matching efficiency and accuracy. For example, the initial estimation can be generated based on two-way sensor fusion of the IMU 606 and the GPS sensor 608. The IMU 606 can provide velocity data with respect to six degrees of freedom that can be compared with positional information from the previous frame to provide a measurement of positional change ($\tilde{R}_I$, $\tilde{T}_I$). The GPS sensor 608 can provide measurement data of the positional change of the movable object, $\tilde{T}_G$ (e.g., with respect to three degrees of translation). In some embodiments, the GPS measurement data can be assigned a weight value $\delta$, as described herein. The weight value $\delta$ can range from 0 to 1 based on the strength of the GPS signal. For example, in an environment where the GPS signal is weak, $\delta$ can be close to 0. In an environment where the GPS signal is strong, $\delta$ can be close to 1. Examples of an environment where the GPS signal can be weak can include an indoor environment, obstructions by structures or naturally occurring features, inclement weather conditions, lack of satellites overhead, or malfunction with a GPS receiver. Examples of environments where the GPS signal can be strong can include an outdoor environment, high altitude, lack of obstructions, or clear weather conditions. In one scenario, a movable object may be flying at low altitude surrounded by a number of tall buildings. This may result in blocking or weakening satellite signals, which may correspondingly cause the data from the GPS system to be accorded lower weight. This may result in data from the GPS system being discounted relative to other sensing systems that have no indication of being compromised. Accordingly, the IMU data ($\tilde{R}_I$, $\tilde{T}_I$) and the GPS sensor data ($\delta$, $\tilde{T}_G$) can be fused using any suitable sensor fusion method as described herein (e.g., a Kalman filter) to generate an initial estimation of the positional change of the movable object ($\tilde{R}$, $\tilde{T}$).

The initial estimation ($\tilde{R}$, $\tilde{T}$) can be used to search for a feature point in a current frame, $m_t^i$, (in which i represents the $i^{th}$ feature point and t represents the current time) corresponding to the same feature point in a previous frame, $m_{t-1}^i$. For example, the estimated 3D coordinate $\hat{p}_{t-1}^i = (\hat{x}_{t-1}^i, \hat{y}_{t-1}^i, \hat{z}_{t-1}^i)$ of the feature point $m_{t-1}^i$ can be rotated according to ($\tilde{R}$, $\tilde{T}$) to obtain $\tilde{R} \cdot \hat{p}_{t-1}^i + \tilde{T}$. The estimated 3D coordinate $\hat{m}_t^i = K\Pi_0(\tilde{R} \cdot \hat{p}_{t-1}^i + \tilde{T})$ can be projected to obtain the position of the feature point after the rotation $\hat{m}_t^i = (\hat{u}_t^i, \hat{v}_t^i)$, where K is the internal parameter matrix for the camera and $\Pi_0$ is the projection matrix. The current frame can then searched and matched for the feature point within a $(\hat{u}_t^i, \hat{v}_t^i)$ area, with a point $m_t^i = (u_t^i, v_t^i)$ having the minimal planar distance from $(\hat{u}_t^i, \hat{v}_t^i)$ considered to be the corresponding point. Accordingly, the frame-to-frame relationship between the feature points $m_{t-1}^i$ and $m_t^i$ can be determined. Stereo matching of feature points between the images obtained by camera 602 and camera 604 can then be performed, such that the 3D position of a feature point can be estimated based on the spatial relationship between cameras 602 and 604.

Figure 7:
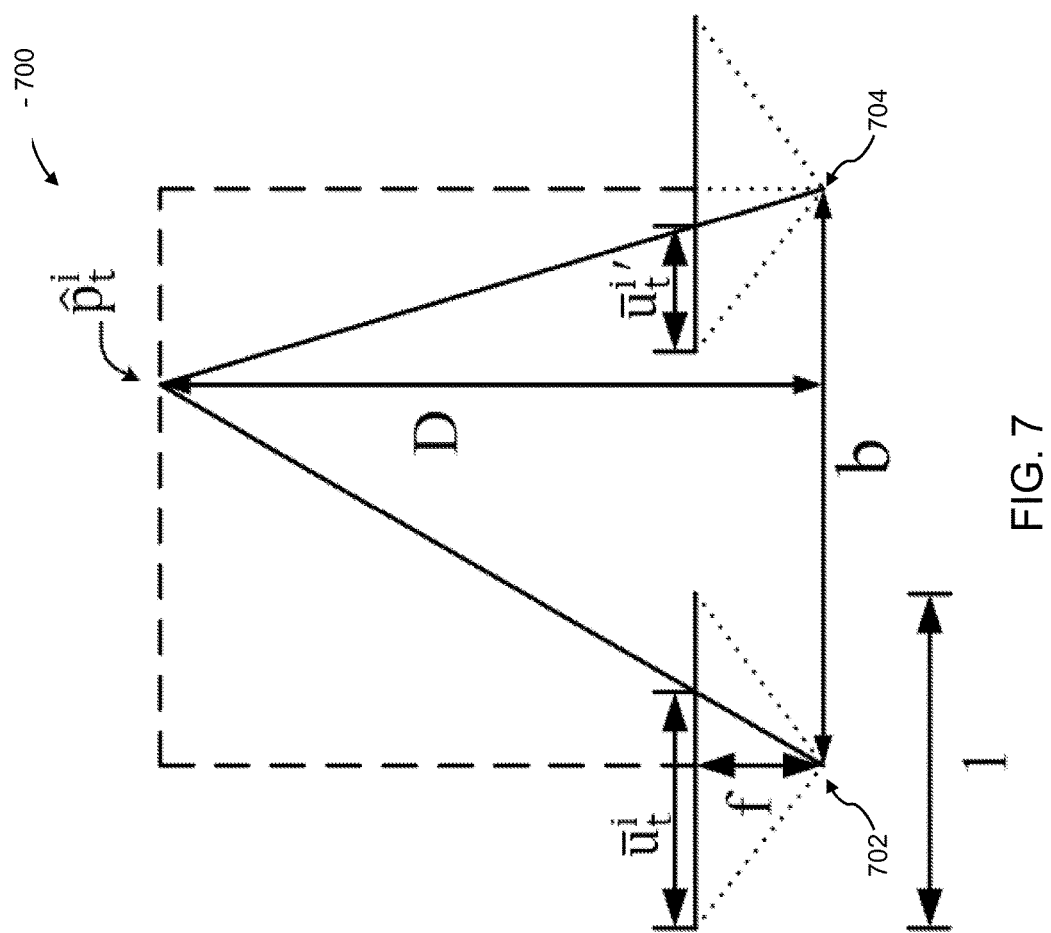
FIG. 7 illustrates a system for stereo vision, in accordance with embodiments of the present invention.

FIG. 7 illustrates a system 700 for stereo vision, in accordance with embodiments. The system 700 can include a left camera and a right camera (not shown) centered at positions 702 and 704, respectively. The parameters focal length f, photosensor size l, and the distance between the cameras b are known for each camera. In some embodiments, the aforementioned parameters are the same for each camera. The 3D coordinate $\hat{p}_t^i$ corresponds to a pair of matched feature points $m_t^i = (u_t^i, v_t^i)$ and $m_t^{i\prime} = (u_t^{i\prime}, v_t^{i\prime})$ in the images captured by the left and right cameras, respectively. The pixel distances $u_t^i$ and $u_t^{i\prime}$ can be multiplied by the size of a single pixel to become spatial distances $\bar{u}_t^i$ and $\bar{u}_t^{i\prime}$. Thus, using the formula $$\frac{D}{f}|\bar{u}_t^i - l/2| + \frac{D}{f}|\bar{u}_t^{i\prime} - l/2| = b$$

the distance between the 3D coordinate $\hat{p}_t^i$ and the cameras, denoted D, can be determined. Based on the internal parameter matrix of the camera K and calculated value of D, the estimated 3D coordinate $\hat{p}_t^i$ can thus be derived for the point $(u_t^i, v_t^i)$.

Following frame-to-frame matching and stereo matching of feature points, a feature point-3D coordinate pair $c_i = \{m_t^i, \hat{p}_t^i\}$ can be obtained for each feature point. The velocity of the cameras can thus be determined by analyzing the motion of the feature points within the images using any suitable algorithm. For example, given a set of n coordinate pairs $c_1, c_2, \ldots c_n$ obtained at a time t, the matrix $\tilde{R}$ can be expressed as three row vectors $\tilde{R} = [\tilde{r}_1 \ \tilde{r}_2 \ \tilde{r}_3]^T$, and the internal parameter matrix of the camera can be expressed as $$K = \begin{bmatrix} f_u & 0 & u_c \\ 0 & f_v & v_c \\ 0 & 0 & 1 \end{bmatrix}$$

Consequently, an estimated positional movement or change between each feature point in time, $\tilde{T}_v$, can be obtained by solving $$\begin{bmatrix} (u_t^1 - u_c)\tilde{r}_3^T \hat{p}_t^1 - f_u \tilde{r}_1^T \hat{p}_t^1 \\ (v_t^1 - v_c)\tilde{r}_3^T \hat{p}_t^1 - f_v \tilde{r}_1^T \hat{p}_t^1 \\ (u_t^2 - u_c)\tilde{r}_3^T \hat{p}_t^2 - f_u \tilde{r}_1^T \hat{p}_t^2 \\ (v_t^2 - v_c)\tilde{r}_3^T \hat{p}_t^2 - f_v \tilde{r}_1^T \hat{p}_t^2 \\ \ldots \\ (u_t^n - u_c)\tilde{r}_3^T \hat{p}_t^n - f_u \tilde{r}_1^T \hat{p}_t^n \\ (v_t^1 - v_c)\tilde{r}_3^T \hat{p}_t^1 - f_v \tilde{r}_1^T \hat{p}_t^1 \end{bmatrix} = \begin{bmatrix} f_u & 0 & u_c - u_t^1 \\ 0 & f_v & v_c - v_t^1 \\ f_u & 0 & u_c - u_t^2 \\ 0 & f_v & v_c - v_t^2 \\ \ldots & \ldots & \ldots \\ f_u & 0 & u_c - u_t^n \\ 0 & f_v & v_c - v_t^n \end{bmatrix} \cdot \tilde{T}_v$$

As the estimated positional movement is primarily obtained based on frame matching of image data from the cameras 602, 604, the accuracy and precision of this estimate can be influenced by the size of n. In some embodiments, a weight value ρ can be assigned to $\tilde{T}_v$, as described herein. The weight value ρ can be based on the size of n. For example, the weight value can range from 0 to 1, and be proportional to n.

A three-way sensor fusion can be performed based on the estimated positional movement from the vision sensing system (ρ, $\tilde{T}_v$), IMU data ($\tilde{R}_I$, $\tilde{T}_I$), and GPS sensor data (δ, $\tilde{T}_G$). Any suitable method can be used to fuse the three sets of sensing data to determine a single positional measurement (R, T) as described herein. In some embodiments, an EKF can be used. Accordingly, at a time t, the positional measurement value can be expressed as $(R_t, T_t)$, such that $$\begin{bmatrix} R_{t+1} \\ T_{t+1} \end{bmatrix} = f\left(\begin{bmatrix} R_t \\ T_t \end{bmatrix}\right) + \omega_t$$

and the measurement functions can be expressed as $$\begin{bmatrix} \tilde{R}_{It} \\ \tilde{T}_{It} \\ \tilde{T}_{vt} \\ \tilde{T}_{Gt} \end{bmatrix} = g\left(\begin{bmatrix} R_t \\ T_t \end{bmatrix}\right) + v_t$$

where $\omega_t$ and $v_t$ represent potential errors in the system having respective variances $Q_t$ and $R_t$.

To obtain $(R_t, T_x)$, an estimated value for the variable $(\hat{R}_{t|t}, \hat{T}_{t|t})$, and a covariance matrix for estimating the accuracy of the estimate $P_{t|t} \circ (\hat{R}_{t|t}, \hat{T}_{t|t})$ and $P_{t|t}$ can be determined by updating the estimate value from the last point in time $(\hat{R}_{t-1|t-1}, \hat{T}_{t-1|t-1})$ and $P_{t-1|t-1}$. For example, the update can be performed using a EKF, such that the update equation can be expressed as $$\begin{bmatrix} \hat{R}_{t|t-1} \\ \hat{T}_{t|t-1} \end{bmatrix} = f\left(\begin{bmatrix} \hat{R}_{t-1|t-1} \\ \hat{T}_{t-1|t-1} \end{bmatrix}\right)$$

$$P_{t|t-1} = F_{t-1} P_{t-1|t-1} F_{t-1}^T + Q_{t-1}$$

$$y = \begin{bmatrix} y_{I1} \\ y_{I2} \\ y_{v3} \\ y_{G4} \end{bmatrix} = \begin{bmatrix} \tilde{R}_{It} \\ \tilde{T}_{It} \\ \tilde{T}_{vt} \\ \tilde{T}_{Gt} \end{bmatrix} - g\left(\begin{bmatrix} \hat{R}_{t|t-1} \\ \hat{T}_{t|t-1} \end{bmatrix}\right)$$

$$S_t = G_t P_{t|t-1} G_t^T + R_{t-1}$$

$$K_t = P_{t|t-1} G_t^T S_t^{-1}$$

$$\begin{bmatrix} \hat{R}_{t|t} \\ \hat{T}_{t|t} \end{bmatrix} = \begin{bmatrix} \hat{R}_{t|t-1} \\ \hat{T}_{t|t-1} \end{bmatrix} + K_t \begin{bmatrix} y_{I1} \\ y_{I2} \\ \rho y_{v3} \\ \delta y_{G4} \end{bmatrix}$$

$$P_{t|t} = (I - K_t G_t) P_{t|t-1}$$

where $F_{t-1}$ is the linear matrix of the function f at point $$\begin{bmatrix} \hat{R}_{t-1|t-1} \\ \hat{T}_{t-1|t-1} \end{bmatrix}$$

and $G_t$ is the linear matrix of the function g at point $$\begin{bmatrix} \hat{R}_{t|t-1} \\ \hat{T}_{t|t-1} \end{bmatrix}.$$

The weight values ρ and δ indicate the degree of "trust" of the sensor fusion algorithm on the GPS data and machine vision algorithm, respectively. Lastly, the current estimated position can be obtained by solving $(R_t, T_t) = (\hat{R}_{t|t}, \hat{T}_{t|t})$ to obtain an accurate measurement of the positional information of the movable object.

As the movable object moves over a relatively long distance, some of the previously identified feature points may move outside the current image frames and thus become unmatchable, which can decrease the value of n and reduce the reliability of the image data. Accordingly, in some embodiments, the algorithm 600 can be periodically "reset" to account for this situation. For example, the algorithm can periodically specify a new "key frame," such that the feature points within the new key frame become the new feature points used as candidates for the feature matching algorithm. Any suitable method can be used to determine when a reset occurs. For example, a reset threshold value can be specified, such that when the number n of coordinate pairs is lower than the reset threshold value, the algorithm 600 is reset. The reset threshold value can be determined based on any suitable parameter, such as the amount of allowable error in the motion estimation, image quality, the feature extraction algorithm, or suitable combinations thereof. In some embodiments, the reset threshold value can be set by a user (e.g., after calibration of the vision sensing system).

In some embodiments, the positional and/or motion information determined by the algorithm 600 can be fed back into one or more sensing systems so as to improve the accuracy of the sensing system. In some embodiments, a velocity or acceleration estimation with respect to six degrees of freedom can be determined based on derivation of the positional information, and provided to one or more sensing systems. For example, the positional and/or motion information can periodically be used to calibrate the reference value of the IMU 606 in order to correct for any accumulation of integration errors over time.

The algorithm 600 can be implemented at any suitable computing speed. For example, the cameras 602, 604 can be configured to receive image data at 20 Hz, the IMU 606 can be configured to receive inertial sensing data at 200 Hz, and the GPS sensor 608 can be configured to receive GPS data at 200 Hz. In some embodiments, the image analysis, frame-to-frame matching, stereo matching, key frame reset, and motion and position estimation can be computed at 20 Hz to obtain 20 fused estimate values per second. In some embodiments, the two-way fusion of the IMU and GPS sensor data and the three-way fusion between the IMU, GPS, and vision sensor data can be computed at 200 Hz. Any other frequency or rates of data gathering or fusion may occur. In some embodiments, cameras may be capable of capturing images at rates of greater than or equal to about 10 Hz, 15 Hz, 20 Hz, 25 Hz, 30 Hz, 35 Hz, 40 Hz, 50 Hz, 60 Hz, 70 Hz, 80 Hz, 90 Hz, 100 Hz, 120 Hz, 150 Hz, 200 Hz, or 300 Hz. Images may be captured at video sampling rates.

Any suitable hardware platform can be used to execute any portion of the algorithm 600, such as embodiments of the systems and devices described herein. For example, the FPGA 414 can be used to perform the image correction and frame-to-frame matching, as described herein. The data 414 can be transmitted to the processing unit 410 in order to execute the remaining steps of the algorithm 600. The positional and/or motion information determined by the processing unit 410 can be stored in the non-transitory computer readable medium 420. In some embodiments, one or more steps of the algorithm 600 can be executed by one or more hardware platforms, such as one or more components of the system 400 which can optionally be located on different devices as described herein. In some embodiments, the data can be transmitted to one or more remote systems having greater computational power than the system 400. For example, the system 400 can be located on the movable object, and raw image data can be transmitted to one or more systems remote from the movable object (e.g., a terminal) via the image transmission module 418. The algorithm 600 can be executed as described herein and the results sent back to the movable object via the communication module 434. This approach advantageously reduces the computational requirements for the hardware onboard the movable object.

Applications

Embodiments of the systems, methods, and devices described herein can be used in any suitable application involving collection of positional and/or motion information for a movable object. In some embodiments, the disclosed systems, methods, and devices can be applied to control and/or navigate an aircraft, such as a UAV. However, the use of language referring to flight, flight path, flight trajectory, and the like in the following examples is not intended to limit the present invention to flying movable objects, as one of skill in the art will appreciate that the embodiments described herein can be applied to movable objects that are not flying.

For example, positional and/or motion information of the movable object provided by one or more sensing systems (e.g., using sensor fusion as described herein) can be used in order to control the position of the movable object with respect to six degrees of freedom (e.g., three degrees of location and three degrees of orientation). In some embodiments, the movable object can respond to control instructions directly provided by a user and transmitted to the movable object (e.g., using a terminal) to free control a location and/or orientation of the movable object (e.g., with respect of altitude, latitude, longitude, roll angle, pitch angle, or yaw angle). Optionally, the movable object can respond to control instructions to control a movement of the movable object. For example the translational velocity and/or the translational acceleration of the movable object may be controlled, up to three degrees of translation movement, such as altitude, latitude and longitude. The angular velocity and/or angular acceleration of the movable object may be controlled, up to three degrees of angular movement, such as rotation about the yaw axis, roll axis, and pitch axis.

Alternatively or in combination, the position control scheme can calculate a path for the movable object to a location specified by the user. The path for the movable object may occur on land, in the water, in the air, or in space. The path for the movable object may be restricted to a surface or may encompass substantially free motion in three degrees of freedom. In some embodiments, the path may be a flight path, and the position control scheme can provide flight trajectory generation. Any description herein of a flight path may apply to any other type of path that may be traversed by a movable object, and vice versa. For example, the user can specify a set of spatial coordinates defining a "home position" to which the movable object automatically returns when a "return command" is received. The return command can cause the movable object to calculate a flight path to the home position based on positional information for the movable object determined as described herein, and then navigate to the home position using the calculated flight path. Optionally, the user can specify a landmark or other environmental feature to be the home position via an interface (e.g., a terminal, display, or other remote controller), and the coordinates of the landmark can be determined by the interface and transmitted to the movable object. In some embodiments, the "home position" can be recorded by the movable object based on positional information obtained during a flight without requiring the input of specific spatial coordinates by the user. For example, the location where the movable object started its flight can be automatically recorded as the home position. Alternatively, any suitable location along the flight path of the movable object can be designated as the home position. For instance, while the movable object is flying, a user can designate the movable object's location as the home location, to which the movable object can return to later. Optionally, multiple preset locations can be specified, either by the user or automatically as described herein, and the movable object can be commanded to navigate to each of the locations in any suitable sequence.

Alternatively or in combination, a position control scheme for the movable object can involve autonomous navigation of the movable object along a predetermined flight path, also known as a pre-stored flight path. For example, a suitable user input can be used to command the movable object to navigate to the starting point of a predetermined flight path stored in memory. The predetermined flight path can include information regarding the spatial disposition of the movable object with respect to six degrees of freedom (e.g., three degrees of location and three degrees of orientation) at each point of the flight path. The movable object can be commanded to navigate along the predetermined flight path along all six degrees until instructed otherwise by the user. For example, the movable object can follow the path location as well as the preset orientations along the path.

The predetermined flight path can be a closed loop, such that the movable object can follow the flight path repeatedly (e.g., autolooping). The closed loop path may be created by recording a previously flown path of the movable object. Alternatively, the closed loop path may be generated or calculated according to one or more parameters and/or one or more pre-selected points. Alternatively, the flight path can have different starting and end points.

The predetermined flight path can include one or more portions defined by user input. For example, the user can provide coordinates defining a flight path for the movable object with respect to six degrees of freedom. The user-defined flight path can include a path template having one or more suitable path parameters input by the user, such that the user does not need to specify coordinates for the entire flight path. In some embodiments, the path template can be a geometric shape, and the path parameters can be one or more dimensions defining the geometric shape. The dimensions can include one or more of the length of an edge, length of an axis, radius of a curve, diameter of a curve, degrees of an arc, curvature of a path, and the like. For example, the path template can be a closed shape, such as a circle with a path parameter being the diameter of the circle, an ellipse with the path parameters being the lengths of the major and minor axes, or a polygon (e.g., square, rectangle, triangle) with path parameters being the length of one or more edges of the polygon. Alternatively, the path template can be an open shape (e.g., a linear, curved, or curvilinear shape), such as a zigzag shape, with a path parameter being a spacing of the zigzag. The parameters of the path template can also include parameters with respect to movable object orientation (e.g., fixed orientation, varying orientation).

Alternatively or in combination, the predetermined flight path can include one or more portions that were traveled and recorded by the movable object during a previous flight (e.g., using spatial coordinates with respect to six degrees of freedom based on the positional and/or motion information determined as described herein). For example, the user can specify a start time and a stop time for recording a flight path during a flight of the movable object. Optionally, an on/off command can be used, such that the recording begins when the on command is provided by the user and ends when the off command is provided by the user. In some embodiments, the recording can be configured to store spatial coordinates of the movable object at specified time intervals or distance intervals, either automatically determined or input by the user. The predetermined flight path can have the same directionality as the recorded flight path, or be the reverse of the recorded flight path. The spatial disposition of the movable object with respect to six degrees of freedom can be the same at one or more points of the predetermined flight path as the recorded flight path. Alternatively, the spatial disposition can be different at one or more points, such as the reverse of the recorded flight path. In some instances, the predetermined path may be the recorded path exactly, along the six degrees of freedom, including location and orientation. In some instances, the predetermined path may be the reverse of the recorded path exactly, along the six degrees of freedom, including location and orientation.

Figure 8:
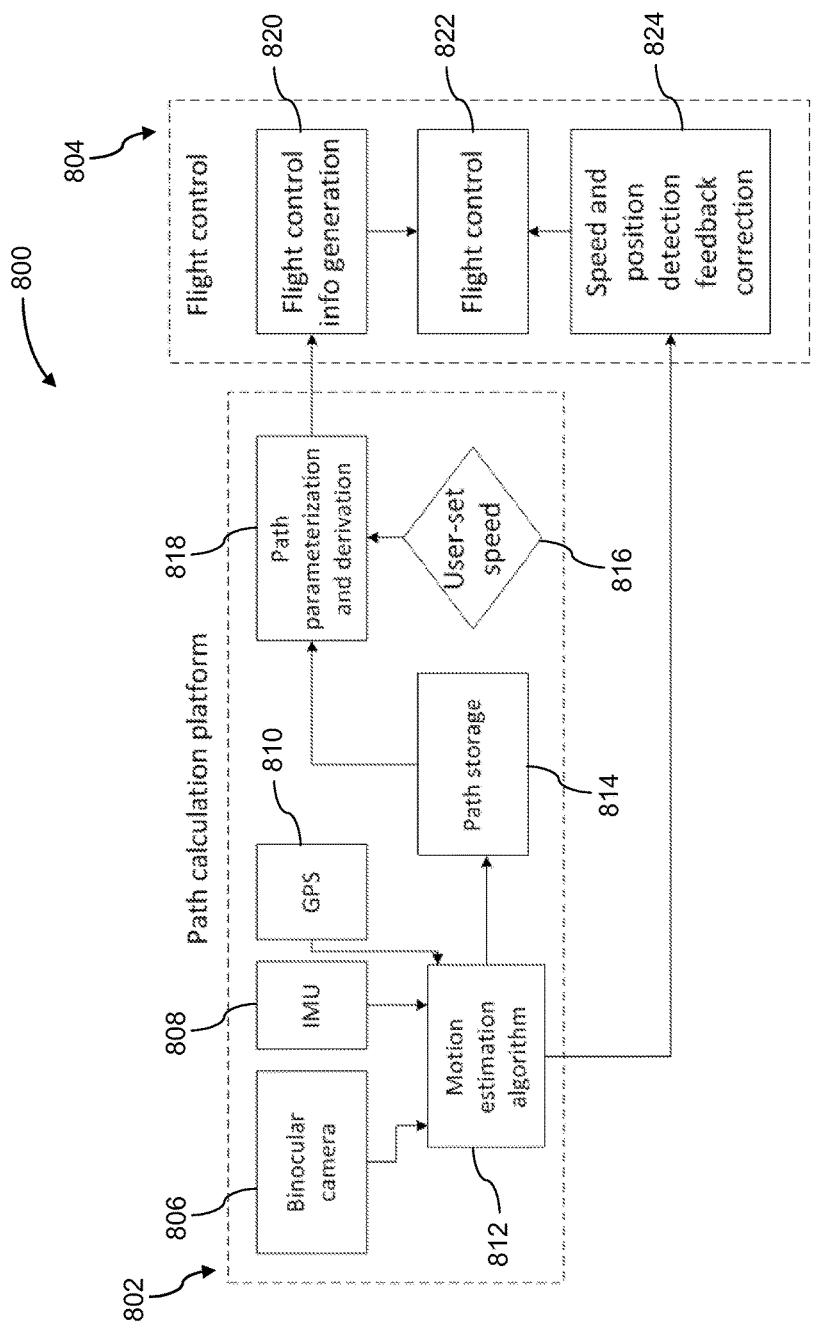
FIG. 8 is a schematic illustration by way of block diagram of a system for navigation of a movable object along a predetermined flight path, in accordance with embodiments of the present invention.

FIG. 8 is a schematic illustration by way of block diagram of a system 800 for navigation of a movable object along a predetermined flight path, in accordance with embodiments of the present invention. The system 800 can be used in combination with any suitable embodiment of the systems, methods, and devices described herein. The system 800 includes a path calculation module 802 and a flight control module 804. The path calculation module 802 includes a vision sensing system 806 (e.g., a pair of binocular cameras), an IMU sensing system 808, and a GPS sensing system 810. The sensing data received from these sensing systems is fused by a motion and/or position estimation module 812 using suitable sensor fusion algorithms, as described herein. As the movable object moves along a flight path (e.g., under the control of the user), the positional and/or motion information generated by the motion and/or position estimation module 812 can be stored in one or more memory units of a path storage module 814. For example, the movable object can set a starting point (0,0), and then determine the positional information (R, T) using the motion and/or position estimation module 812 for a series of key points along the flight path. The key points can be determined based, for example, on a time interval, distance interval, or a suitable combination thereof. The flight path defined by the curve of key points $\{(0,0), (R_1, T_1), (R_2, T_2), \ldots, (R_n, T_n)\}$ is stored in the path storage module 814.

A suitable user input can be used to command the movable object to navigate autonomously along the predetermined flight path stored in the path storage module 814. In some embodiments, a user input 816 can be provided in order to define velocity and/or acceleration parameters of the movable object along the predetermined flight path. Suitable velocity and/or acceleration parameters are described in greater detail below. A path parameterization module 818 can be used to reparameterize the predetermined flight path based on the user input. For example, the number of key points in the flight path curve can vary based on a user-specified velocity to be maintained by the movable object along the flight path, such that the new number of key points can be solved based on the geometry of the flight path curve.

The reparameterized flight path can be transmitted to the flight control module 804. The flight control module 804 includes a flight control information generation module 820 configured to determine position, velocity, and/or acceleration information of the flight path with respect to six degrees of freedom. For example, the flight control information generation module 820 can determine the difference between consecutive key points and take a partial derivative of the difference to determine the linear acceleration and angular acceleration ($\ddot{R}_t$, $\ddot{T}_t$) required to reach the next key point. Optionally, the number of key points can be varied based on the velocity of the movable object, as described herein. In some embodiments, an increased velocity may result in an increased number of key points. Alternatively, an increased velocity may result in a fewer number of key points. A sufficient number of key points may be selected to permit the movable object to follow the path. The acceleration information can be input into a flight control module 822 to maneuver the movable object (e.g., via a suitable actuation mechanism, such as one or more motors) to follow the flight path by navigating to the next key point.

In some embodiments, during the navigation process, the motion and/or position estimation module 812 can calculate the current spatial disposition and/or motion of the movable object as described herein. This information can be input into a feedback correction module 824 of the flight control module 804 to determine the current spatial disposition of the movable object relative to the predetermined flight path in order to correct any errors that occur during navigation of the predetermined flight path. For example, given an erroneous navigation to ($R_{t+1}'$, $T_{t+1}'$) instead of ($R_{t+1}$, $T_{t+1}$) at time t+1, the feedback correction module 824 can be configured to compensate for the difference between ($R_{t+1}'$, $T_{t+1}'$) and ($R_{t+1}$, $T_{t+1}$) when navigating to the next key point at ($R_{t+2}$, $T_{t+2}$) at time t+2.

In some embodiments, the position of the movable object may be controlled freely by a user using a terminal or any other remote control system. Rather than following a predetermined path, the user may provide commands to control the movable object in real-time. For example, the user may instruct the movable object to maintain position, change location and/or change orientation. In some instances, a default may be provided. The default may be for the movable object to maintain position. For example, if no input is provided from the user, the movable object may hover. In other embodiments, the default may be to continue with the previous instructions. For example, if the user instructed the movable object to move forward, the movable object may continue to move forward at the same rate unless instructed otherwise. In some embodiments, the commands from the user may be provided via a user interface of the terminal, position/movement of the terminal, or any other input as discussed elsewhere herein.

In some embodiments, a control of the movable object position and movement can be a combination of any of the types of control described elsewhere herein. For instance, the movable object path can be a combination of a pre-stored path, calculated path, and/or free control by the user. In one example, a movable object may follow a pre-recorded path location. However, the user may control the movable object in real-time to adjust the orientation of the movable object, so that the movable object need not follow the pre-recorded orientation of the movable object.

In some embodiments, the sensor fusion-based motion and/or position estimation methods described herein can be used to control the velocity of the movable object with respect to six degrees of freedom as described herein. Such velocity controls can be used independently or in combination with any suitable embodiment of the position control schemes described herein. For example, one or more velocity controls disclosed herein can be applied to free control, flight trajectory generation, or a predetermined flight path, as previously described.

For example, the user can define a velocity profile and/or rules for the movable object. The velocity profile and/or rules can include a maximum allowable velocity, a minimum allowable velocity, a velocity range, a constant velocity, or a variable velocity, or suitable combinations thereof, to be maintained by the movable object during a flight. The velocity profile and/or rules can be applied to a translational velocity or an angular velocity of the movable object. In some instances, a velocity profile and/or rules applied to a translational velocity may govern an angular velocity, or vice versa. For example, a maximum velocity can be specified for the movable object, such that the movable object is not allowed to exceed the maximum velocity. In some instances, a maximum translational velocity (e.g., linear speed) and/or the maximum angular velocity (e.g., rotational speed) may be specified. The movable object may move at a velocity so that neither the maximum translational velocity nor the maximum angular velocity is exceeded. In some instances, following a predetermined path (including predetermined location and orientation) may result in tying in the translational and angular velocities. In some instances, to not exceed one of the types of velocities (e.g., translational velocity), the movable object may not meet the maximum velocity of the other type of velocity (e.g., angular velocity). In some instances, a maximum translational velocity and a maximum angular velocity can be specified, such that neither can be exceeded by the movable object. The velocity profile and/or rules can be maintained during free control of the movable object, such that user commands that would result in a violation of the velocity profile and/or rules are modified or overridden.

A movable object may traverse a path in accordance with one or more velocity profiles or rules. The path of the movable object may be predetermined, may be freely controlled in real time by a user, and/or may be calculated in real-time with aid of a processor. The velocity profile may indicate the speed (linear and/or rotational speed) at which the movable object traverses the path. Any description herein of the movable object traversing a predetermined flight path in relation to the velocity rules may be applied also to other types of path including freely human controlled paths, or computer-calculated paths.

In some embodiments, a predetermined flight path traversed by the movable object can be associated with a velocity profile and/or rules (e.g., provided via user input 816) to be followed while the movable object traverses the flight path. The predetermined flight path can be divided into one or more segments, with each segment having its own velocity profile and/or rules to be followed by the movable object while traversing the segment. For example, the movable object can be commanded to travel a first path segment at a constant velocity and then a second path segment at a different constant velocity. For example, the velocity profile may specify that the movable object travel with a translational velocity of 3 m/s along the first 100 meters, and then travel with a translational velocity of 5 m/s along the second 200 meters, before returning to a velocity of 3 m/s along the rest of the path. The movable object may follow this velocity profile along the path (which can define both the translational and angular position of the movable object along the path), which may result in governing both the translational velocity and the corresponding angular velocity. In some instances, the movable object can be commanded to travel a first path segment at a variable velocity and then a second path segment at a constant velocity. Optionally, the entirety of the predetermined flight path can be associated with the same velocity profile and/or rules. In some embodiments, the velocity profile and/or rules can be altered (e.g., based on user input) while the movable object is following the predetermined flight path. In some embodiments, the predetermined flight path can be a recorded flight path as described herein, and the velocity profile can be the same as the velocity profile of the movable object during a previous traversal of the recorded flight path (e.g., during the recording process). Alternatively, one or more velocity values of the velocity profile can be different from a velocity of the movable object during a previous traversal of the recorded flight path.

The velocity profile and/or rules can be determined by any suitable means. For example, the velocity profile and/or rules can be provided via user input (e.g., via a remote control such as a terminal) and stored in memory. Such velocity profiles and/or rules determined by the user can be established prior to flight of the movable object or in real-time while the movable object is flying. Optionally, the velocity profile and/or rules can be pre-stored into a memory of the movable object prior to the flight. The velocity profile and/or rules can be pre-stored off-board and sent to the movable object prior to or during flight. Alternatively or in combination, the velocity profile and/or rules can be determined dynamically in real-time by a suitable processor and/or algorithm based on a state of the movable object during flight (e.g., an altitude, latitude, longitude, roll angle, pitch angle, or yaw angle of the movable object). In some embodiments, the velocity profile and/or rules can be based on positional and/or motion information of the movable object provided by one or more sensing systems (e.g., determined using sensor fusion of one or more sensing systems including GPS, IMU, vision, or proximity, as described herein). For example, a maximum velocity can be specified for the movable object based on the measured altitude of movable object, with a higher maximum velocity at higher altitudes, and a lower maximum velocity at lower altitudes. This can be advantageous, for example, in reducing the possibility of collisions with structures near the ground.

Figure 9:
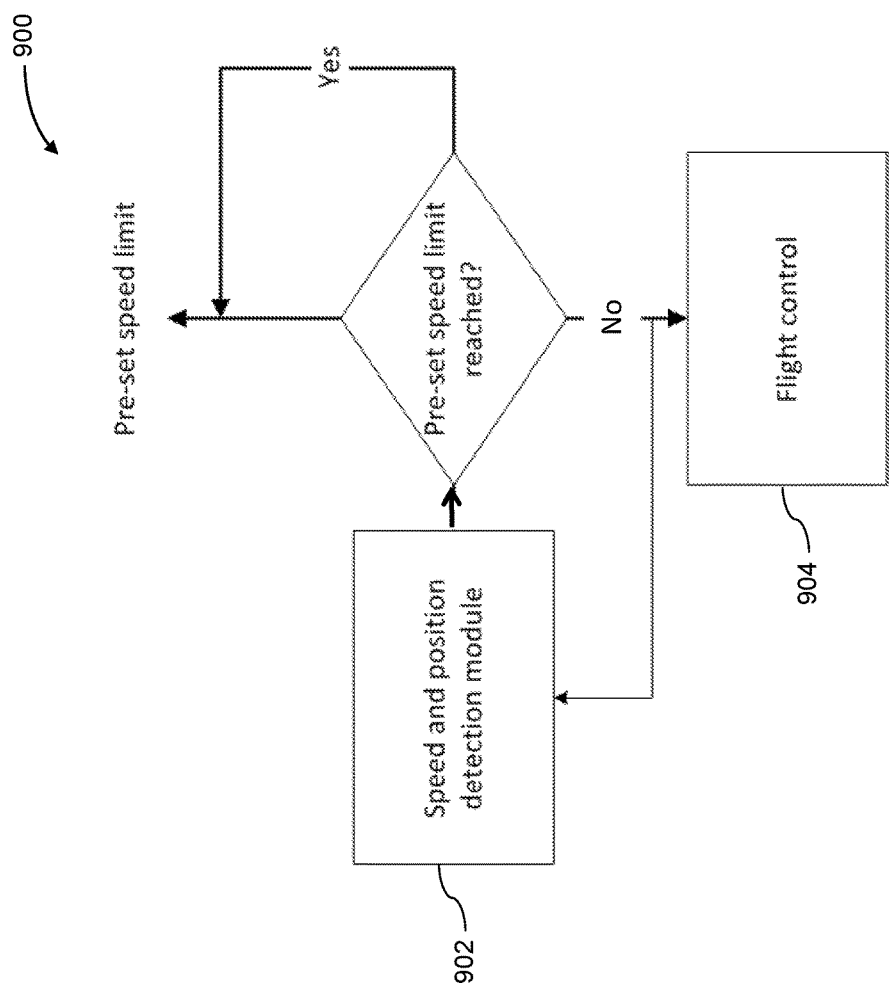
FIG. 9 is a schematic illustration by way of block diagram of a system for velocity control of a movable object, in accordance with embodiments of the present invention.

FIG. 9 is schematic illustration by way of block diagram of a system 900 for velocity control of a movable object such as a UAV, in accordance with embodiments of the present invention. The system 900 can be used in combination with any suitable embodiment of the systems, methods, and devices described herein. The system 900 includes a position and/or motion estimation module 902 and a flight control module 904. During the flight of the movable object, the position and/or motion estimation module 902 determines the current velocity of the movable object using suitable embodiments of the sensor fusion methods described herein. The current velocity value can be compared against a specified velocity profile and/or rule. The flight control module 904 controls a suitable actuation mechanism (e.g., one or more motors) to adjust the velocity of the movable object to be in accordance with the velocity profile and/or rule. In the embodiment of FIG. 9, the velocity profile and/or rule is depicted as a pre-set speed limit of the movable object, and the speed information generated by module 902 is fed back to prevent the movable object from exceeding the pre-set speed limit.

Additionally, one of skill in the art would appreciate that embodiments of the velocity controls described herein can also be applied to control of the acceleration of the movable object with respect to six degrees of freedom. For example, an acceleration profile and/or rules can be specified for the movable object similar to the velocity profile and/or rules as previously described. In one example, a maximum translational acceleration and/or maximum angular acceleration may be provided. Any suitable combination of position controls, velocity controls, and acceleration controls can be applied to any of the applications described herein (e.g., for free control, flight trajectory generation, or a predetermined flight path).

In some embodiments, position controls may be established separately from movement controls, such as velocity and acceleration controls. Movement controls may be applied to position controls, such as a predetermined path (generated by user or with aid of a processor), or real-time generated path (generated by user or with aid of processor). Position controls and movement controls may be created separately using different mechanisms, or using the same mechanisms. Position controls and different velocity/acceleration profiles can be mixed and matched as desired by the user. Position controls and movement controls can be stored and/or accessed separately from movement controls.

In some embodiments, the positional and/or motion information for the movable object can be displayed on a user interface. The user interface can be any interface adapted for navigation and control of the movable object from a remote control center, such as a display (e.g., a touchscreen display) or terminal as previously described herein. In some instances, a separate display device may be provided from a control terminal. Alternatively, both control and display functionality may be provided within a single device. The user interface can receive user input, such as input from a keyboard, mouse, joystick, touch screen, voice recognition system, gesture recognition system, or suitable combinations thereof. Any suitable information can be displayed on the user interface, such as positional information for the movable object (e.g., latitude, longitude, altitude, roll angle, pitch angle, yaw angle, origin, destination, previously traveled flight path, future flight trajectory, predetermined flight path, home position, or preset location) or motion information with respect to six degrees of freedom (e.g., velocity or acceleration). The positional and/or motion information can be displayed as one or more of an alphanumeric value, symbol or shape, size of a symbol or shape, color or color gradient, and the like. Optionally, the user interface can display information relating to a payload of the movable object, such as size, weight, payload type, location and/or orientation of the payload with respect to six degrees of freedom, state (e.g., whether a functional element is on or off) or data transmitted by the payload (e.g., data collected by a payload sensor such as a camera image or video feed). In some embodiments, the user interface can display information relating to the environment surrounding the movable object, such as a map (e.g., a topographical map) of the environment. Additional information can be overlaid on the map, such as information relating to elevation, latitude, longitude, orientation, weather conditions, geographical features, manmade features (e.g., buildings, roads, political boundaries), and the like. The map may or may not show underlying topological features. The map may be viewed from above, or may be angled to show one or more feature from different angles. The user interface can also be used to control the how the information is displayed. Optionally, the displayed information can be zoomed in, zoomed out, rotated, translated, segmented into multiple viewing angles, combined into a single viewing angle, and the like.

In some embodiments, the user interface can include one or more user controls configured to control one or more of the movable object, carrier or payload with respect to position, velocity, and/or acceleration as described herein. Optionally, the user interface can include separate controls for each of the movable object, carrier, and payload, such that each can be controlled simultaneously and/or independently. Additionally, the user controls can be used to control the state of one or more of an element of the movable object, carrier, or payload, such as a sensing system, actuation mechanism, communication device, processing unit, or any other functional device. For example, the user controls can be used to provide commands to the movable object relating to one or more of free control, flight trajectory generation, a predetermined flight path, velocity profile and/or rules, or acceleration profile and/or rules, as previously described. In some embodiments, the user controls can control a state of the payload by controlling the movable object and/or carrier, as described herein. Optionally, the user interface can include controls for a payload camera, such as on, off, location, orientation, zoom, or focus.

Figure 10:
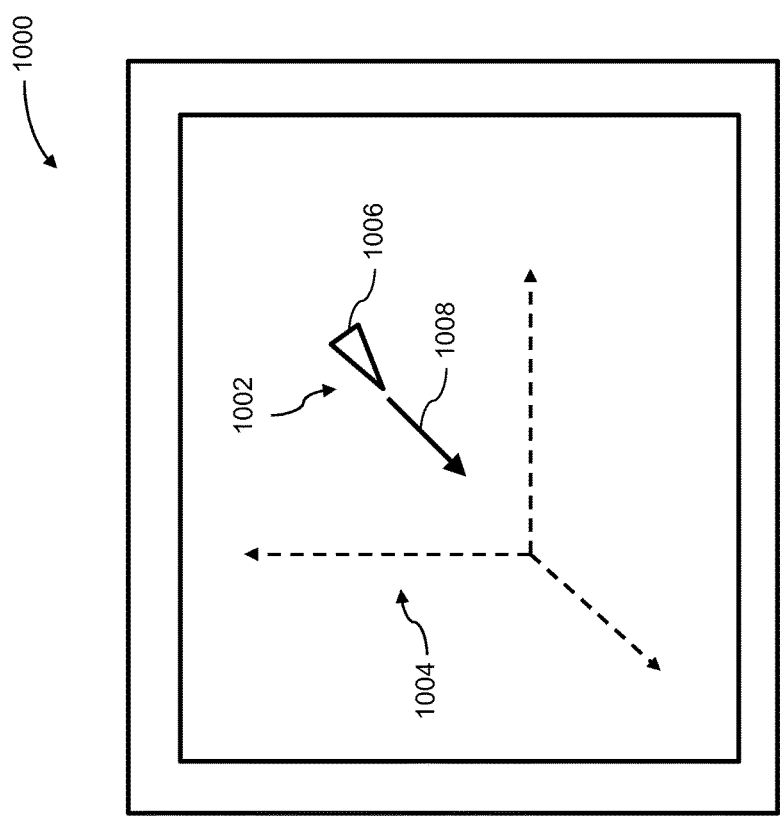
FIG. 10 illustrates a user interface for control and navigation of a movable object, in accordance with embodiments of the present invention.

FIG. 10 illustrates a user interface 1000 for control and navigation of a movable object, in accordance with embodiments of the present invention. The user interface 1000 can be used in combination with any suitable embodiment of the systems, methods, and devices described herein. The user interface 1000 includes a visual indicator 1002 for a movable object relative to a three-dimensional (3D) coordinate system 1004. The position and/or orientation of the 3D coordinate system 1004 can be adjusted, with the visual indicator 1002 being adjusted accordingly. For instance, a user may view the movable object from different angles. Information pertaining to the relative location of the movable object (e.g., coordinate system, environment/map) may also move correspondingly. In some instances, the user may control the view of the movable object by swiping or touching a touchscreen. The visual indicator includes a first indicator 1006 indicating the spatial disposition of the movable object in real-time with respect to six degrees of freedom, and a second indicator 1008. The first indicator 1006 can indicate the orientation of the movable object, for example, by using an arrow indicating the direction in which the movable object is positioned to move. The second indicator 1008 can be used to depict a direction of motion of the movable object. For example, the second indicator 1008 can be an arrow indicating the 3D direction of motion, with the length of the arrow corresponding to the magnitude of the motion. Alternatively, the second indicator 1008 can be an arrow used to depict a facing direction of a payload of the movable object (e.g., a payload camera). In some instances, only a single indicator need be provided. The single indicator may be indicative of the orientation of the movable object. The orientation of the movable object may refer to the trajectory of travel for the movable object and/or the direction of a payload. In some embodiments, the visual indicator 1002 can include alphanumerical values representing the positional and/or motion information of the movable object, as described herein While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for determining positional information of a movable object, said method comprising:
   receiving data from a first sensing system coupled to the movable object, said first sensing system comprising a first sensor configured to obtain a first signal useful for determining the positional information of the movable object;
   receiving data from a second sensing system coupled to the movable object, said second sensing system comprising a second sensor configured to obtain a second signal useful for determining the positional information of the movable object;
   receiving data outputted by a third sensing system coupled to the movable object, said third sensing system comprising a third sensor configured to obtain a third signal useful for determining the positional information of the movable object;
   determining, with aid of a processor, a second weight value for the data from the second sensing system based on a strength of the second signal received by the second sensor;
   generating, with aid of the processor, an estimation of a positional change of the movable object based on (i) the data from the first sensing system and (ii) the data from the second sensing system factoring in the second weight value;
   processing the data outputted by the third sensing system by selecting a portion of the data outputted by the third sensing system according to the estimation of the positional change as processed data; and
   calculating, with aid of the processor, the positional information of the movable object based on (a) the estimation of the positional change of the movable object, and (b) the processed data.

2. The method of claim 1, wherein the movable object is an unmanned aerial vehicle.

3. The method of claim 1, wherein calculating the positional information of the movable object comprises calculating location information and orientation information of the movable object.

4. The method of claim 1, further comprising:
   determining, with aid of the processor, a third weight value for the data outputted by the third sensing system based on a vision-based accuracy parameter that is associated with an environment within which the third sensing system operates.

5. The method of claim 4, further comprising: calculating, with aid of the processor, the positional information of the movable object based on the data outputted by the third sensing system factoring in the third weight value.

6. The method of claim 4, wherein the third sensing system comprises one or more vision sensors configured to obtain the third signal, and wherein the vision-based accuracy parameter is indicative of an accuracy of a machine vision algorithm that is used to analyze the third signal.

7. The method of claim 6, wherein the third weight value is lower when the machine vision algorithm is less accurate for the environment in which the movable object operates.

8. The method of claim 7, wherein the environment is at high altitude and/or above water.

9. The method of claim 1, wherein the second sensor comprises a global positioning system (GPS) sensor configured to obtain the second signal, and wherein the strength of the second signal received by the GPS sensor of the second sensing system depends on a number of GPS signals received and/or a magnitude of the GPS signals received.

10. The method of claim 9, wherein the second weight value for the data from the second sensing system has (1) a higher weight value when the strength of the second signal is high, and (2) a lower weight value when the strength of the second signal is low.

11. The method of claim 1, wherein the third sensing system comprises one or more vision sensors configured to obtain the third signal.

12. The method of claim 1, wherein said first sensing system comprises an inertial measurement unit (IMU).

13. The method of claim 1, further comprising:
receiving an instruction for the movable object to return to a preset location.

14. The method of claim 13, further comprising:
calculating, with aid of the processor, a route for the movable object to travel to return to the preset location, based on the calculated positional information of the movable object.

15. The method of claim 1, further comprising storing, with aid of a path storage module, the positional information of the movable object at a plurality of different time points; and defining, with aid of the processor, a flight path for the movable object using the positional information of the movable object at a plurality of different time points.

16. The method of claim 1, further comprising determining, with aid of the processor, a velocity rule for the movable object based on the positional information, wherein the velocity rule defines a maximum or minimum velocity for the movable object.

17. The method of claim 1, further comprising:
feeding the positional information back to at least one of the first sensing system, the second sensing system, or the third sensing system.

18. A system for determining positional information of a movable object, said system comprising:
a first sensing system coupled to the movable object, said first sensing system comprising a first sensor configured to obtain a first signal useful for determining the positional information of the movable object;
a second sensing system coupled to the movable object, said second sensing system comprising a second sensor configured to obtain a second signal useful for determining the positional information of the movable object; and
a third sensing system coupled to the movable object, said third sensing system comprising a third sensor configured to obtain a third signal useful for determining the position information of the movable object;
a processor configured to:
determine a second weight value for data received from the second sensing system based on a strength of the second signal;
generate an estimation of a positional change of the movable object based on (i) data from the first sensing system and (ii) the data from the second sensing system factoring in the second weight value;
process data output by the third sensing system by selecting a portion of the data outputted by the third sensing system according to the estimation of the positional change as processed data; and
calculate the positional information of the movable object based on (i) the estimation of the positional change of the movable object, and (ii) the processed data.

19. The system of claim 18, wherein the processor is further configured to determine a third weight value for the data outputted by the third sensing system based on a vision-based accuracy parameter that is associated with an environment within which the third sensing system operates.

20. The system of claim 19, wherein the processor is further configured to calculate the positional information of the movable object based on the data outputted by the third sensing system factoring in the third weight value.

* * * * *